United States Patent
Na et al.

(10) Patent No.: US 9,967,746 B2
(45) Date of Patent: May 8, 2018

(54) METHOD OF PERFORMING COMMUNICATION AND ELECTRONIC DEVICE SUPPORTING SAME

(71) Applicant: Samsung Electronics Co., Ltd., Gyeonggi-do (KR)

(72) Inventors: Se Jeong Na, Gyeonggi-do (KR); Donghyoun Son, Gyeonggi-do (KR); Inseok Shim, Gyeonggi-do (KR); Changhoon Kim, Gyeonggi-do (KR); Sungkyu Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days. days.

(21) Appl. No.: 15/206,536

(22) Filed: Jul. 11, 2016

(65) Prior Publication Data
US 2017/0094511 A1    Mar. 30, 2017

(30) Foreign Application Priority Data

Sep. 24, 2015   (KR) .................. 10-2015-0135074

(51) Int. Cl.
*H04M 3/16* (2006.01)
*H04W 12/06* (2009.01)
*H04W 76/02* (2009.01)

(52) U.S. Cl.
CPC ......... *H04W 12/06* (2013.01); *H04W 76/021* (2013.01); *H04W 76/023* (2013.01)

(58) Field of Classification Search
CPC .. H04W 12/06; H04W 76/021; H04W 76/023
USPC ......................................................... 455/411
See application file for complete search history.

(56) References Cited

U.S. PATENT DOCUMENTS

| 8,260,261 | B2* | 9/2012 | Teague | H04L 9/3273 455/410 |
|---|---|---|---|---|
| 2005/0010417 | A1* | 1/2005 | Holmes | H04M 1/6066 704/275 |
| 2006/0282649 | A1* | 12/2006 | Malamud | H04L 63/0861 712/26 |
| 2008/0057868 | A1 | 3/2008 | Chang | |
| 2013/0308506 | A1* | 11/2013 | Kim | H04W 76/023 370/310 |
| 2014/0046664 | A1* | 2/2014 | Sarkar | H04W 12/06 704/246 |
| 2014/0335789 | A1* | 11/2014 | Cohen | H04W 8/005 455/41.2 |
| 2015/0271168 | A1* | 9/2015 | Sheng | H04L 63/083 455/411 |

\* cited by examiner

*Primary Examiner* — William Nealon
(74) *Attorney, Agent, or Firm* — Cha & Reiter, LLC

(57) ABSTRACT

An electronic device comprising: a microphone; a communication circuit; a memory; and at least one processor operatively coupled to the memory, configured to: acquire voice data by using the microphone; identify a user corresponding to the voice data; select an external device based at least in part on an identity of the user; and transmit a connection request to the external device by using the communication circuit.

18 Claims, 20 Drawing Sheets

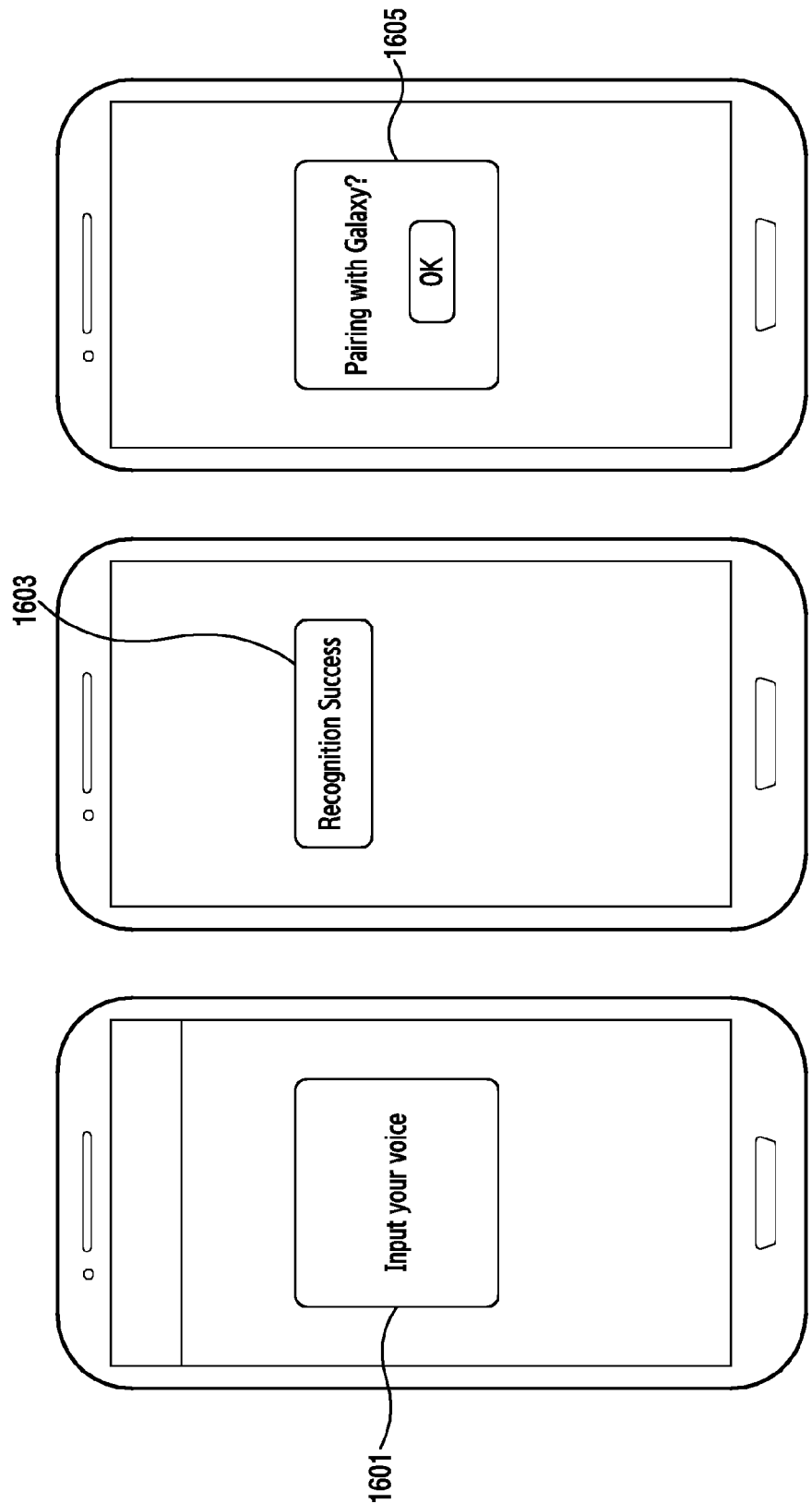

METHOD OF PERFORMING COMMUNICATION AND ELECTRONIC DEVICE SUPPORTING SAME

CLAIM OF PRIORITY

This application claims priority under 35 U.S.C. § 119(a) to Korean Application Serial No. 10-2015-0135074, which was filed in the Korean Intellectual Property Office on Sep. 24, 2015, the entire content of which is hereby incorporated by reference.

TECHNICAL FIELD

The present disclosure relates to electronic devices, in general, and more particularly to a method of performing communication and an electronic device supporting the same.

BACKGROUND

On the strength of the remarkable development of information communication technologies and semiconductor technologies, the supply and use of various portable electronic devices have rapidly increased. According to the wide supply of electronic devices, the electronic devices support various functions through a link to other electronic devices. The electronic device may transmit/receive data to/from another electronic device (for example, a headset, a speaker, or the like) through a communication connection and thus are able to use a function of the other electronic device. For example, the electronic device may communicate with another electronic device through a short-range communication module (for example, Bluetooth module or the like). The electronic device may transfer a command to the other electronic device and execute a function of the other electronic device.

SUMMARY

According to aspects of the disclosure, an electronic device is provided comprising: a microphone; a communication circuit; a memory; and at least one processor operatively coupled to the memory, configured to: acquire voice data by using the microphone; identify a user corresponding to the voice data; select an external device based at least in part on an identity of the user; and transmit a connection request to the external device by using the communication circuit.

According to aspects of the disclosure, a method is provided for use in an electronic device, comprising: acquiring voice data by using a microphone; identifying a user corresponding to the voice data; selecting an external device based at least in part on an identity of the user; and transmitting a connection request to the external device by using a communication circuit.

According to aspects of the disclosure, an electronic device is provided comprising: a memory; a microphone; a communication circuit; at least one processor operatively coupled to the memory, configured to: acquire a voice command by using the microphone; recognize a user corresponding to the voice command; select an external device based at least in part on the voice command and an identity of the user; and establish a wireless connection with the external device by using the communication circuit.

According to aspects of the disclosure, a computer-readable recording medium is provided that stores one or more processor-executable instructions which when executed by at least one processor cause the at least one processor to perform a method comprising the steps of: acquiring voice data; identifying a user corresponding to the voice data; selecting an external device based at least in part on an identity of the user; and transmitting a connection request to the external device.

BRIEF DESCRIPTION OF THE DRAWINGS

The above and other aspects, features, and advantages of the present disclosure will be more apparent from the following detailed description taken in conjunction with the accompanying drawings, in which:

FIG. 16A is a diagram of an example of a user interface, according to an embodiment of the present disclosure;

FIG. 16B is a diagram of an example of a user interface, according to an embodiment of the present disclosure;

FIG. 16C is a diagram of an example of a user interface, according to an embodiment of the present disclosure;

DETAILED DESCRIPTION

Figure 1:
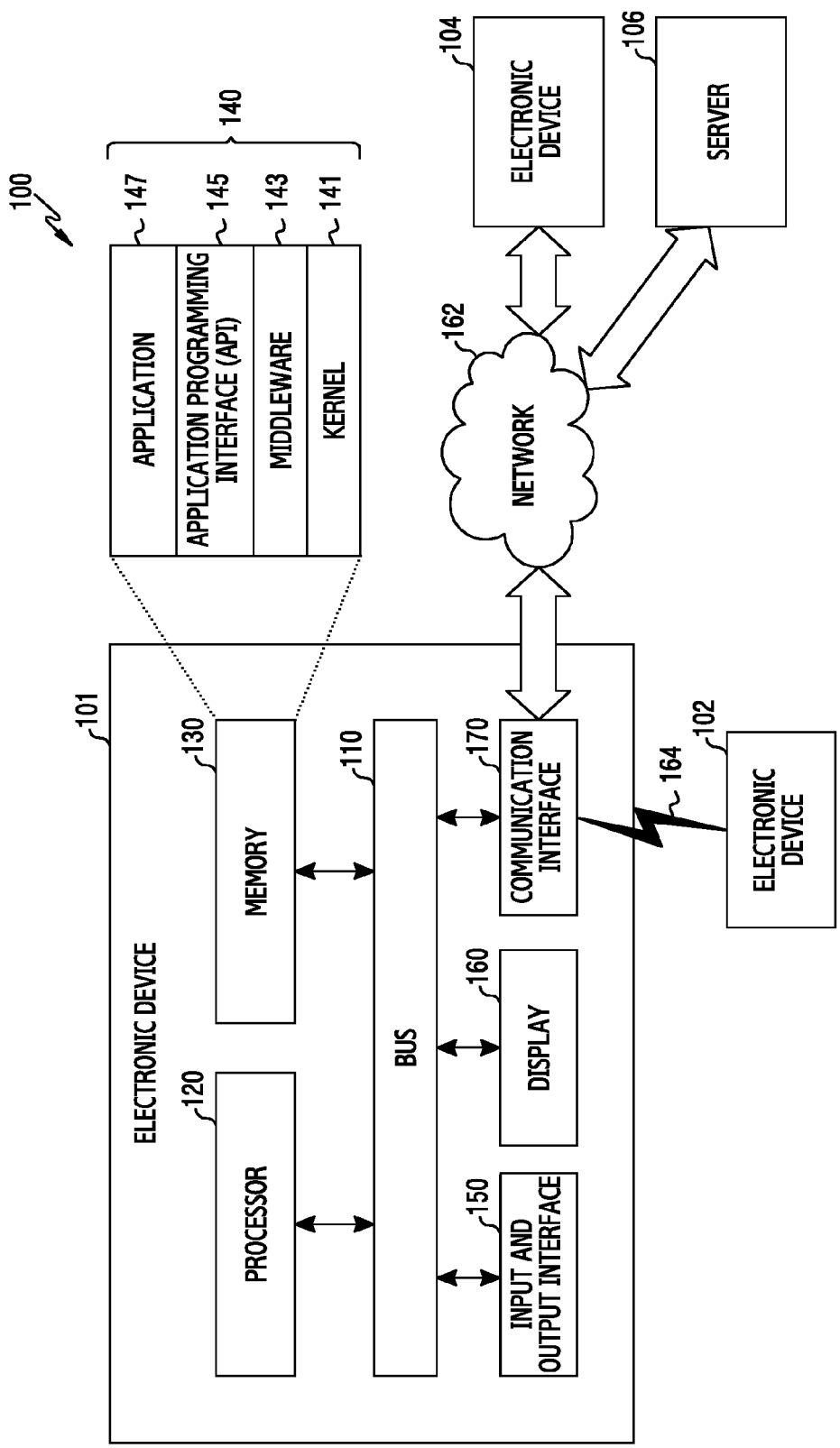
FIG. 1 is a diagram of an example of a network environment including an electronic device, according to various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including both at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a diagram of an example of a network environment including an electronic device, according to various embodiments of the present disclosure.

An electronic device 101 within a network environment 100, according to various embodiments, will be described with reference to FIG. 1. The electronic device 101 may include a bus 110, a processor 120, a memory 130, an input/output interface 150, a display 160, and a communication interface 170. In some embodiments, the electronic device 101 may omit at least one of the above elements or may further include other elements.

The bus 110 may include, for example, a circuit for connecting the elements 110-170 and transferring communication (e.g., control messages and/or data) between the elements.

The processor 120 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. For example, the processor 120 may include one or more of a Central Processing Unit (CPU), an Application Processor (AP), and a Communication Processor (CP). The processor 120, for example, may carry out operations or data processing relating to control and/or communication of at least one other element of the electronic device 101.

The memory 130 may include any suitable type of volatile or non-volatile memory, such as Random-access Memory (RAM), Read-Only Memory (ROM), Network Accessible Storage (NAS), cloud storage, a Solid State Drive (SSD), etc. The memory 130 may include a volatile memory and/or a non-volatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented by the other programs (e.g., the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143, for example, may function as an intermediary for allowing the API 145 or the application programs 147 to communicate with the kernel 141 to exchange data.

In addition, the middleware 143 may process one or more operation requests received from the application program 147 according to priority. For example, the middleware 143 may give priority to use the system resources of the electronic device 101 (for example, the bus 110, the processor 120, the memory 130, and the like) to at least one of the application programs 147. For example, the middleware 143 may perform scheduling or load balancing with respect to the one or more operation requests by processing the one or more operation requests according to the priority given to the at least one application program.

The API 145 is an interface through which the applications 147 control functions provided from the kernel 141 or the middleware 143, and may include, for example, at least one interface or function (e.g., instruction) for file control, window control, image processing, or text control.

The input/output interface 150, for example, may function as an interface that may transfer instructions or data input from a user or another external device to the other element(s) of the electronic device 101. Furthermore, the input/output interface 150 may output the instructions or data received from the other element(s) of the electronic device 101 to the user or another external device.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 160, for example, may display various types of content (e.g., text, images, videos, icons, or symbols) for the user. The display 160 may include a touch screen and receive, for example, a touch, gesture, proximity, or hovering input using an electronic pen or the user's body part.

The communication interface 170, for example, may set communication between the electronic device 101 and an external device (e.g., the first external electronic device 102, the second external electronic device 104, or a server 106). For example, the communication interface 170 may be connected to a network 162 through wireless or wired communication to communicate with the external device (e.g., the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. In addition, the wireless communication may include, for example, short range communication 164. The short-range communication 164 may be performed by using at least one of, for example, Wi-Fi, Bluetooth, Bluetooth low energy (BLE), Near Field Communication (NFC), and Global Navigation Satellite System (GNSS). The GNSS may include at least one of, for example, a Global Positioning System (GPS), a Global Navigation Satellite System (Glonass), a Beidou Navigation Satellite System (hereinafter referred to as "Beidou"), and a European Global Satellite-based Navigation System (Galileo), according to a use area, a bandwidth, or the like. Hereinafter, in the present disclosure, the "GPS" may be interchangeably used with the "GNSS". The wired communication may include at least one of, for example, a Universal Serial Bus (USB), a High Definition Multimedia Interface (HDMI), Recommended Standard 232 (RS-232), and a Plain Old Telephone Service (POTS). The network 162 may include at least one of a communication network such as a computer network (e.g., a LAN or a WAN), the Internet, and a telephone network.

Each of the first and second external electronic apparatuses 102 and 104 may be of a type identical to or different from that of the electronic apparatus 101. According to an embodiment, the server 106 may include a group of one or more servers. According to various embodiments, all or some of the operations performed in the electronic device 101 may be performed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (e.g., the electronic device 102 or 104 or the server 106) instead of performing the functions or services by itself or in addition. Another electronic apparatus may execute the requested functions or the additional functions, and may deliver a result of the execution to the electronic apparatus 101. The electronic device 101 may process the received result as it is or additionally to provide the requested functions or services. To achieve this, for example, cloud computing, distributed computing, or client-server computing technology may be used.

Figure 2:
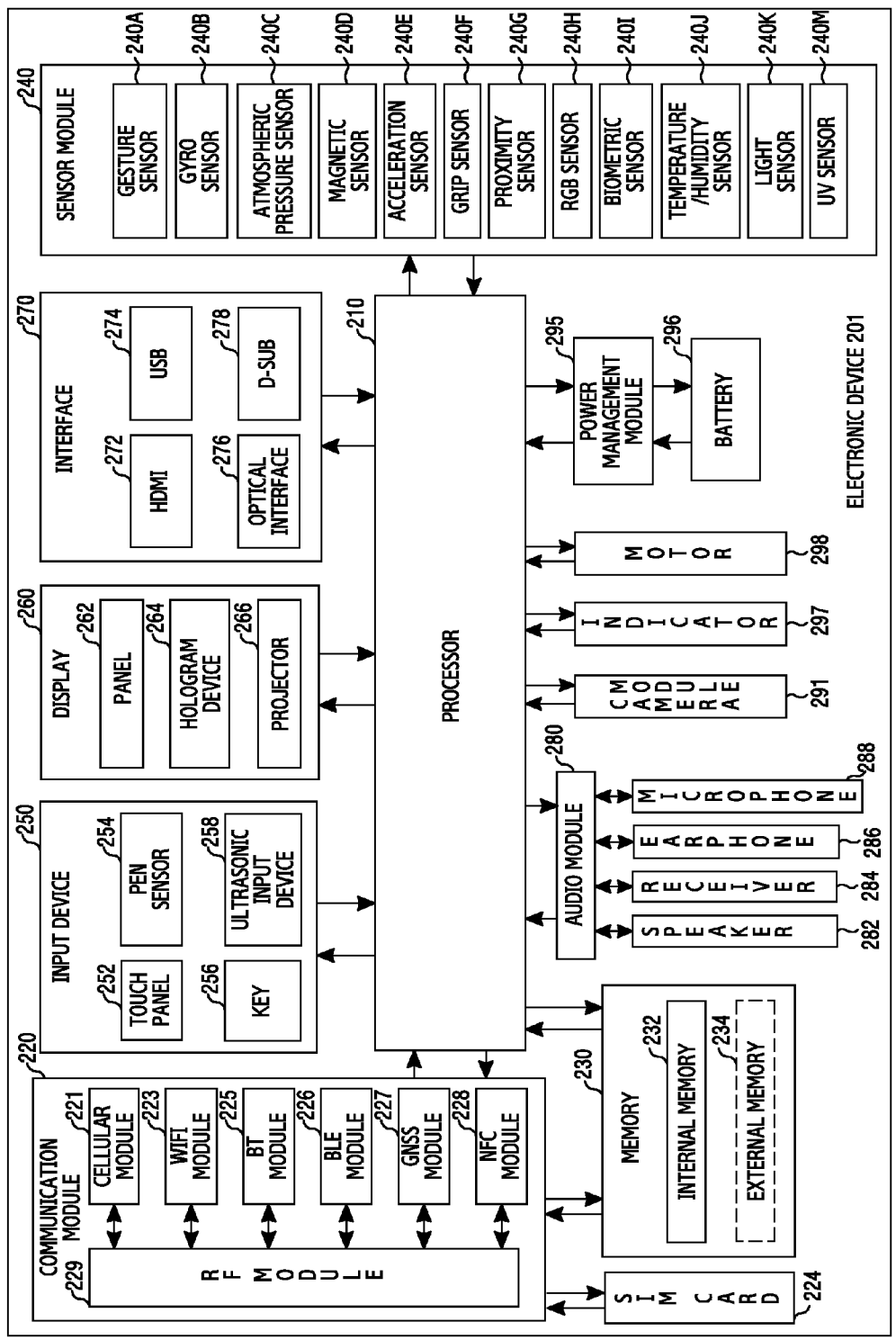
FIG. 2 is a block diagram of an example of an electronic device, according to various embodiments of the present disclosure.

FIG. 2 is a block diagram of an example of an electronic device, according to various embodiments of the present disclosure.

For example, the electronic apparatus 201 may include the whole or part of the electronic apparatus 101 illustrated in FIG. 1. The electronic device 201 may include at least one processor (e.g., Application Processor (AP)) 210, a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program and perform processing of various pieces of data and calculations. The processor 210 may be implemented by, for example, a System on Chip (SoC). According to an embodiment, the processor 210 may further include a Graphic Processing Unit (GPU) and/or an image signal processor. The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store various data in a non-volatile memory.

The communication module 220 may have a configuration equal or similar to that of the communication interface 170 of FIG. 1. The communication module 220 may include, for example, the cellular module 221, a Wi-Fi module 223, a Bluetooth (BT) module 225, a Bluetooth low energy module 226, a GNSS module 227 (e.g., a GPS module, a Glonass module, a Beidou module, or a Galileo module), an NFC module 228, and a Radio Frequency (RF) module 229.

The cellular module 221 may provide a voice call, image call, a text message service, or an Internet service through, for example, a communication network. According to an embodiment, the cellular module 221 may distinguish between and authenticate electronic devices 201 within a communication network using a subscriber identification module (for example, the SIM card 224). According to an embodiment of the present disclosure, the cellular module 221 may perform at least some of the functions that the processor 210 may provide. According to an embodiment, the cellular module 221 may include a Communication Processor (CP).

Each of the Wi-Fi module 223, the BT module 225, the Bluetooth low energy module 226, the GNSS module 227, and the NFC module 228 may include, for example, a processor for processing data transmitted and received through the relevant module. According to some embodiments of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229 may transmit/receive, for example, a communication signal (for example, an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the Wi-Fi module 223, the BT module 225, the Bluetooth low energy module 226, the GNSS module 227, and the NFC module 228 may transmit and receive RF signals through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (for example, the memory 130) may include, for example, an internal memory 232 or an external memory 234. The embedded memory 232 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 234 may be functionally and/or physically connected to the electronic apparatus 201 through various interfaces.

The sensor module 240 may measure a physical quantity or detect an operation state of the electronic device 201, and may convert the measured or detected information into an electrical signal. For example, the sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a Red/Green/Blue (RGB) sensor), a bio-sensor 240I, a temperature/humidity sensor 240J, a light sensor 240K, and an Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments of the present disclosure, the electronic apparatus 201 may further include a processor configured to control the sensor module 240 as a part of or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use at least one of, for example, a capacitive type, a resistive type, an infrared type, and an ultrasonic type. Also, the touch panel 252 may further include a control circuit. The touch panel 252 may further include a tactile layer and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic wavers generated by an input tool through a microphone (for example, a microphone 288) and identify data corresponding to the detected ultrasonic waves.

The display 260 (for example, the display 160) may include a panel 262, a hologram device 264 or a projector 266. The panel 262 may include a configuration that is identical or similar to the display 160 illustrated in FIG. 1. The panel 262 may be implemented to be, for example, flexible, transparent, or wearable. The panel 262 and the touch panel 252 may be implemented as one module. The hologram 264 may show a three dimensional image in the air by using an interference of light. The projector 266 may display an image by projecting light onto a screen. The screen may be located, for example, inside or outside the electronic apparatus 201. According to an embodiment, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may bilaterally convert, for example, a sound and an electrical signal. At least some elements of the audio module 280 may be included in, for example, the input/output interface 145 illustrated in FIG. 1. The audio module 280 may process sound information which is input or output through, for example, a speaker 282, a receiver 284, earphones 286, the microphone 288 or the like.

The camera module 291 is a device which may photograph a still image and a dynamic image. According to an embodiment, the camera module 291 may include one or more image sensors (for example, a front sensor or a back sensor), a lens, an Image Signal Processor (ISP) or a flash (for example, LED or xenon lamp).

The power management module 295 may manage, for example, power of the electronic device 201. According to an embodiment, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature during the charging. The battery 296 may include, for example, a rechargeable battery or a solar battery.

The indicator 297 may display a particular state (e.g., a booting state, a message state, a charging state, or the like) of the electronic apparatus 201 or a part (e.g., the processor 210). The motor 298 may convert an electrical signal into mechanical vibration, and may generate vibration, a haptic effect, or the like. Although not illustrated, the electronic apparatus 201 may include a processing unit (e.g., a GPU) for supporting a mobile television (TV). The processing unit for supporting mobile TV may, for example, process media data according to a certain standard such as Digital Multimedia Broadcasting (DMB), Digital Video Broadcasting (DVB), or mediaFLO™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
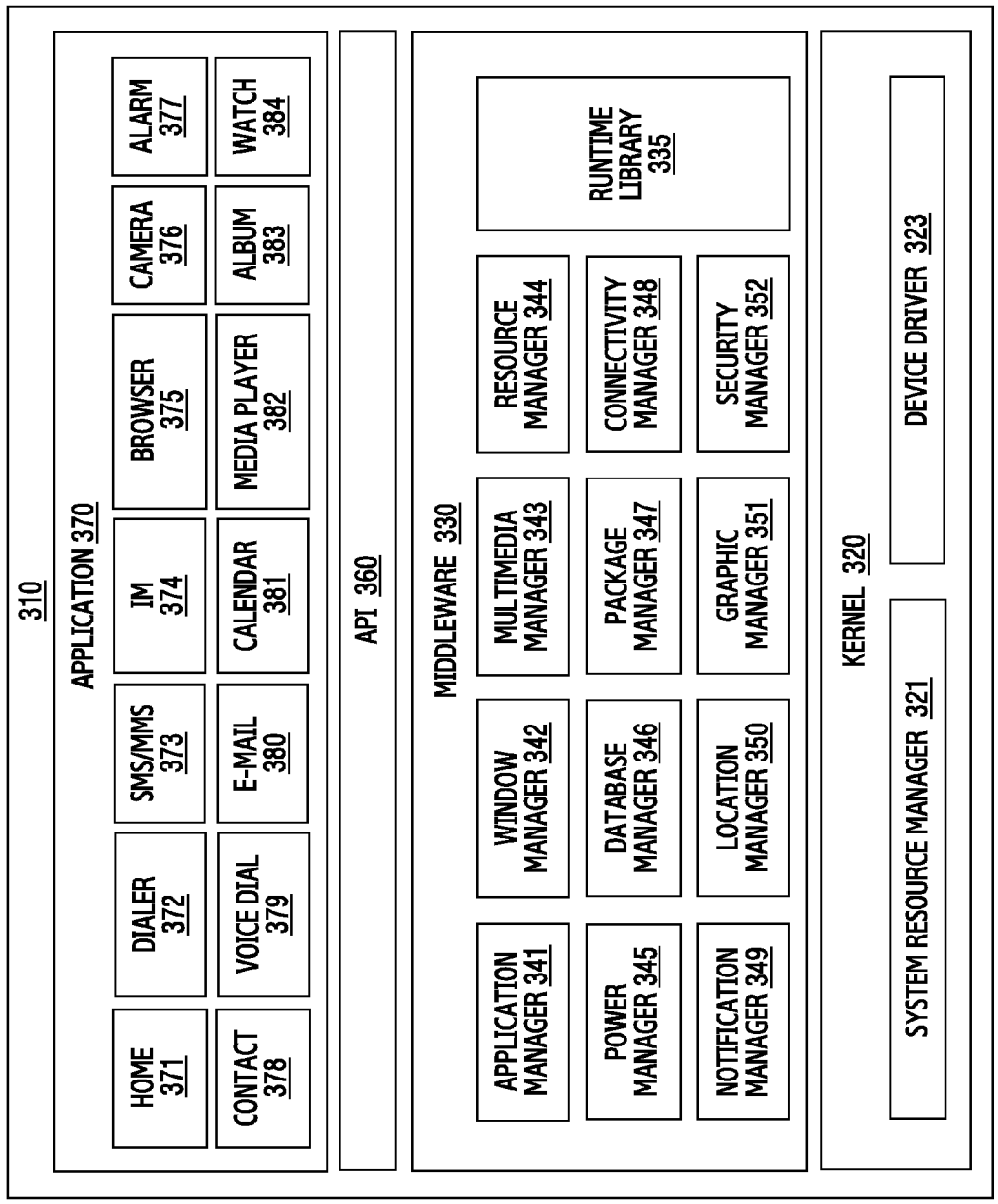
FIG. 3 is a block diagram of an example of a program module, according to various embodiments of the present disclosure.

FIG. 3 is a block diagram of an example of a program module, according to various embodiments of the present disclosure.

According to an embodiment, the program module 310 (for example, the program 140) may include an Operating System (OS) for controlling resources related to the electronic device (for example, the electronic device 101) and/or various applications (for example, the application programs 147) executed in the operating system. The operating system may be, for example, Android, iOS, Windows, Symbian, Tizen, Bada, or the like.

The program module 310 may include a kernel 320, middleware 330, an API 360, and/or an application 370. At least some of the program module 310 may be preloaded on the electronic apparatus, or may be downloaded from an external electronic apparatus (e.g., the electronic apparatus 102 or 104, or the server 106).

The kernel 320 (e.g., the kernel 141) may include, for example, a system resource manager 321 and/or a device driver 323. The system resource manager 321 may perform the control, allocation, retrieval, or the like of system resources. According to an embodiment of the present disclosure, the system resource manager 321 may include a process manager, a memory manager, a file system manager, or the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide a function required by the applications 370 in common or provide various functions to the applications 370 through the API 360 so that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may perform input/output management, memory management, the functionality for an arithmetic function, or the like.

The application manager 341 may manage, for example, the life cycle of at least one of the applications 370. The window manager 342 may manage Graphical User Interface (GUI) resources used for the screen. The multimedia manager 343 may determine a format required to reproduce various media files, and may encode or decode a media file by using a coder/decoder (codec) appropriate for the relevant format. The resource manager 344 may manage resources, such as a source code, a memory, a storage space, and the like of at least one of the applications 370.

The power manager 345 may operate together with a Basic Input/Output System (BIOS) to manage a battery or power and may provide power information required for the operation of the electronic device. The database manager 346 may generate, search for, and/or change a database to be used by at least one of the applications 370. The package manager 347 may manage the installation or update of an application distributed in the form of a package file.

The connectivity manager 348 may manage a wireless connection such as, for example, Wi-Fi or Bluetooth. The notification manager 349 may display or notify of an event, such as an arrival message, an appointment, a proximity notification, and the like, in such a manner as not to disturb the user. The location manager 350 may manage location information of the electronic apparatus. The graphic manager 351 may manage a graphic effect, which is to be provided to the user, or a user interface related to the graphic effect. The security manager 352 may provide various security functions required for system security, user authentication, and the like. According to an embodiment of the present disclosure, when the electronic apparatus (e.g., the electronic apparatus 101) has a telephone call function, the middleware 330 may further include a telephony manager for managing a voice call function or a video call function of the electronic apparatus.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (for example, the application program 147) may include, for example, one or more applications which can provide functions such as home 371, dialer 372, SMS/MMS 373, Instant Message (IM) 374, browser 375, camera 376, alarm 377, contacts 378, voice dialer 379, email 380, calendar 381, media player 382, album 383, clock 384, health care (for example, measure exercise quantity or blood sugar), or environment information (for example, atmospheric pressure, humidity, or temperature information).

According to an embodiment of the present disclosure, the applications 370 may include an application (hereinafter, referred to as an "information exchange application" for convenience of description) supporting information exchange between the electronic apparatus (e.g., the electronic apparatus 101) and an external electronic apparatus (e.g., the electronic apparatus 102 or 104). The application associated with information exchange may include, for example, a notification relay application for forwarding specific information to an external electronic device, or a device management application for managing an external electronic device.

For example, the notification relay application may include a function of delivering, to the external electronic apparatus (e.g., the electronic apparatus 102 or 104), notification information generated by other applications (e.g., an SMS/MMS application, an email application, a health care application, an environmental information application, etc.) of the electronic apparatus 101. Further, the notification relay application may receive notification information from, for example, an external electronic device and provide the received notification information to a user.

The device management application may manage (for example, install, delete, or update), for example, a function for at least a part of the external electronic device (for example, the electronic device 102 or 104) communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an embodiment, the applications 370 may include applications (for example, a health care application of a mobile medical appliance or the like) designated according to attributes of the external electronic device 102 or 104. According to an embodiment of the present disclosure, the application 370 may include an application received from the external electronic apparatus (e.g., the server 106, or the electronic apparatus 102 or 104). According to an embodiment of the present disclosure, the application 370 may include a preloaded application or a third party application which can be downloaded from the server. Names of the elements of the program module 310, according to the above-described embodiments of the present disclosure, may change depending on the type of OS.

According to various embodiments of the present disclosure, at least some of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module' may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

An electronic device according to various embodiments of the present disclosure may include: a housing; a microphone exposed through the housing; a communication circuit arranged inside the housing; a processor electrically connected to the microphone and the communication circuit; and a memory electrically connected to the processor, wherein the memory stores instructions to instruct the processor to acquire one or more voices by using the microphone, to recognize a user corresponding to the one or more acquired voices, to select one of a plurality of external devices at least partially based on the user recognition, and to transmit a request for a connection with the selected external device to the selected external device by using the communication circuit when the instructions are executed.

According to an embodiment, the instructions may instruct the processor to transmit a request for a connection with a first external device to the first external device by using the communication circuit when the recognized user is a first user and to transmit a request for a connection with a second external device to the second external device when the recognized user is a second user.

According to an embodiment, the instructions may instruct the processor to select one of the plurality of external devices at least partially based on contents of the acquired voice when the instructions are executed.

According to an embodiment, the instructions may instruct the processor to determine whether the acquired voice includes at least one of a selected term, phrase, and sentence and, when the acquired voice includes at least one of the selected term, phrase, and sentence, to recognize the user corresponding to the acquired voice when the instructions are executed.

According to an embodiment, when the acquired voice does not include at least one of the selected term, phrase, and sentence, the instructions may instruct the processor to establish the connection with the external device by a pairing scheme set by default without recognizing the user corresponding to the acquired voice when the instructions are executed.

According to an embodiment, the pairing scheme set by default may include a scheme for establishing a connection with an external device, which was just previously paired with the electronic device, a scheme for establishing a connection with an external device, which has been most frequently paired with the electronic device previously, a scheme for establishing a connection with an external device, which is mostly closed located to the electronic device, or a combination of one or more of schemes for establishing a connection with a device, which provides a selected function related to a current state or operation of the electronic device.

According to an embodiment, the instructions may instruct the processor to control the communication circuit to transmit signals that make a request for a communication connection to a plurality of external devices corresponding to the recognized user when the instructions are executed.

According to an embodiment, the instructions may instruct the processor to detect whether the selected external device is in an active state and to transmit a request for activating the external device and/or a request for a connection with the external device to the external device by using the communication circuit according to whether the external device is in the active state when the instructions are executed.

According to an embodiment, the instructions may instruct the processor to store in advance a user's voice received through the microphone and/or a user's voice received through a microphone of the external device in the memory and to recognize the user corresponding to the one or more acquired voices at least partially based on the stored user's voice when the instructions are executed.

According to an embodiment, the instructions may instruct the processor to wirelessly communicate with the external device by using the communication circuit, to transmit a request for acquiring the user's voice, to the external device, and to receive information on the user's voice acquired by the external device from the external device when the instructions are executed.

According to an embodiment, the instructions may instruct the processor to store in advance at least one of a term, phrase, and sentence included in the user's voice received through the microphone or through the microphone of the external device in the memory and, when the acquired voice includes at least one of the stored term, phrase, and sentence, to recognize the user corresponding to the acquired voice when the instructions are executed.

According to an embodiment, the communication circuit may be configured to support at least one of short-range communication including Bluetooth communication, Wireless Local Area Network (WLAN), millimeter wave communication, cellular communication, mobile communication, and wired communication.

According to an embodiment, the housing may include a first structure configured to be worn on a user's ears, and the first structure includes a speaker, which is exposed through a part of the first structure and arranged to face the user's eardrums.

According to an embodiment, the housing may include a second structure connected to the first structure, and the microphone is included within the second structure.

According to an embodiment, the electronic device may not include a display.

According to an embodiment, the plurality of external devices may include an electronic device having a display.

An electronic device according to various embodiments of the present disclosure may include: a housing; a microphone exposed through at least a part of the housing; a communication circuit arranged inside the housing; a processor electrically connected to the microphone and the communication circuit; and a memory electrically connected to the processor, wherein the memory stores instructions to acquire a pre-selected voice command of a user by using the microphone, to recognize a user corresponding to the acquired voice command, to select one of a plurality of pre-registered external devices at least partially based on the voice command and the user recognition, to establish a wireless connection with the selected external device by using the communication circuit, and to transmit and/or receive data to/from the external device when the instructions are executed.

According to an embodiment, the electronic device may include a headset or an earphone device, and the external device may include at least one of a smart phone, a tablet computer, a laptop computer, a television, a robot, an infotainment system of a car, a head unit of a car, a mobile phone, a video phone, a desktop PC, a laptop PC, and a netbook computer.

According to an embodiment, the electronic device may include a smart phone, and the external device may include at least one of a smart phone accessory device, a tablet computer, a laptop computer, a television, a robot, an infotainment system of a car, a head unit of a car, a mobile phone, a video phone, a desktop PC, a laptop PC, and a netbook computer.

Figure 4:
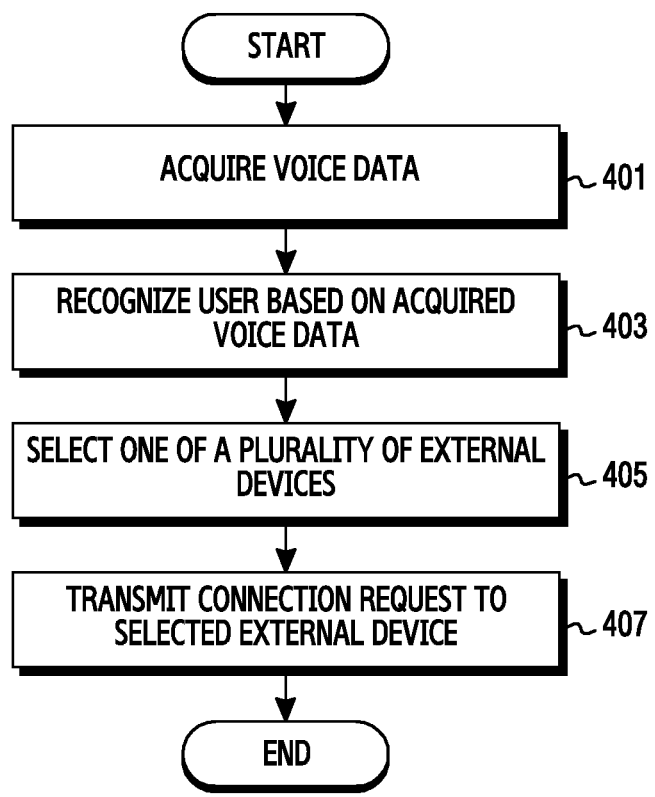
FIG. 4 is a flowchart of an example of a process, according to an embodiment of the present disclosure.

FIG. 4 is a flowchart of an example of a process, according to an embodiment of the present disclosure.

Referring to FIG. 4, a processor (for example, the processor 120) may acquire voice of a user in operation 401 according to an embodiment of the present disclosure. According to aspects of the disclosure, the processor may acquire voice data. According to aspects of the disclosure, the voice data may include a voice recording. Additionally or alternatively, the voice data may include information that identifies one or more characteristics of a user's voice.

Additionally or alternatively, at least a part of the voice may be information related to the voice or based at least in part on of the voice. For example, the voice of the user may be input into a microphone (for example, the microphone 288). The microphone may convert the input voice (or, a voice signal or an analog signal) into an electric signal (or a digital signal) and transfer the converted electric signal to a processor. The processor may receive the electrical signal from the microphone and acquire at least a part of the voice.

According to an embodiment, the processor may acquire (or receive) at least a part of the user's voice from the microphone of an external device. For example, the processor may control a wireless communication performing operation between the electronic device and the external device. The processor may control an operation for transmitting a signal that makes a request for acquiring the user's voice to the external device. The processor may acquire at least a part of the user's voice input into the external device.

According to an embodiment, operation 401 may further include for activating a communication connection function (hereinafter, referred to as a "smart pairing function") using user recognition. For example, when an input for activating a smart pairing application is received from the user, the processor may activate the smart pairing function. However, the present disclosure is not limited thereto. For example, when power is supplied to the electronic device (for example, the electronic device 101) and each element of the electronic device is initialized, the processor may automatically activate the smart pairing function according to settings.

According to an embodiment, operation 401 may further include activating a user recognition module. According to an embodiment, the user recognition module may be a module for recognizing (or identifying or verifying) the user (or a speaker) based at least in part on of the voice acquired from the user.

According to another embodiment, the user recognition module may recognize the voice as well as the user based at least in part on of the user's voice. According to an embodiment, voice recognition may be an operation for identifying linguistic semantic contents from the voice by an automatic means. For example, the voice recognition may be a processing operation for identifying a word or a word string at least based on a waveform of the input voice and extracting a meaning thereof. In another example, the voice recognition may include recognizing a phoneme, recognizing a word, analyzing a sentence, and extracting a meaning as well as analyzing the voice. The voice recognition operation will be described in detail with reference to FIG. 5.

According to an embodiment, the user recognition module may be included as an element of the electronic device. According to another embodiment, a memory (for example, the memory 130) may store instructions to instruct the processor to recognize the user by using the user recognition module.

According to an embodiment, operation 401 may further include receiving from the user an input for executing the smart pairing function. For example, when the user input for executing the smart pairing function is received when the smart pairing function is activated, the processor may control a display (for example, the display 150) to output a screen for receiving the voice of the user at least partially based on the user input. However, this is only an example and the technical idea of the present disclosure is not limited thereto. For example, the processor may acquire at least a part of the user's voice by a user voice input without the user input for executing the smart pairing function when the smart pairing function is activated, for example, when a smart pairing application operates in the background of the system.

According to an embodiment, when a communication connection with an external device is made, the processor may set the system such that the microphone remains in a turned-on state while the electronic device is in a power-on state for a communication connection with another external device (for example, "always on mic"). For example, the processor may set the system such that the microphone remains in the turned-on state by using a low power microphone and a low power voice recognition module.

According to another embodiment, the processor 120 may set the microphone 288 to be in the turned-on state for a predetermined time, for example, a predetermined time after the power-on or a predetermined time after a particular event.

In operation 403 according to an embodiment of the present disclosure, the processor may recognize the user based at least in part on of the acquired voice. More particularly, in some implementations, the processor may identify the user based on voice data that is acquired in operation 401.

According to an embodiment, the processor may analyze a frequency characteristic of the acquired voice and recognize the user through a comparison between the acquired voice and a pre-stored voice data associated with the user (e.g., a voice template). For example, the processor may determine whether at least a part of the acquired voice data matches at least a part of the pre-stored voice data. The processor may recognize the user according to whether at least the part of the acquired voice data is equal (or similar) to at least the part of the pre-stored voice data (e.g., voice template). According to aspects to the disclosure, the acquired voice data (or portion thereof) may match the pre-stored voice data (e.g., voice template) when the pre-stored voice data is the same or similar to the acquired voice data and/or otherwise satisfies a predetermined matching condition.

According to an embodiment, the processor may use various methods (or algorithms) for user recognition (for example, speaker identification) or speaker verification. For example, for the user recognition, the processor may use a Gaussian Mixture Model (GMM)-based user recognition method, a minimum classification error score weight-based user recognition method, or a Support Vector Machine (SVM)-based user recognition method. However, they are only examples and methods for recognizing the user are not limited thereto.

In operation 405 according to an embodiment of the present disclosure, the processor may select one of a plurality of external devices at least partially based on user recognition.

According to an embodiment, the processor may identify at least a part of information on the external device mapped to the recognized user (or recognized user voice data) among the plurality of external devices. For example, the processor may identify a Bluetooth Device Address (BD_ADDR) of the external device (for example, a Bluetooth device), which is mapped to the recognized user and designated to perform a communication connection function in accordance with the recognized user. In another example, the processor may identify a Bluetooth device name of the external device mapped to the recognized user among the plurality of external devices. However, the present disclosure is not limited thereto. For example, in addition to the Bluetooth device address or the Bluetooth device name, the processor may identify at least a part of another identification information required for the communication connection with the external device.

According to an embodiment, the processor may select at least one external device as a device to perform the communication function based at least in part on of the identified information.

According to an embodiment, when the user is not recognized based at least in part on of the acquired voice, the processor may induce the user to input a voice again. For example, when at least a part of the user voice information is different from at least a part of the registered user voice information (or when user recognition fails), the processor may control the display to output a screen for inducing the user to input a voice again. In another example, when at least a part of the user's voice is different from at least a part of the registered (or pre-stored) user's voice data, the processor may control an audio module (for example, the audio module 280) to output a voice for inducing the user to input a voice again, control a motor (for example, the motor 298) to output a vibration (or a haptic effect), or control a lamp to output a light. However, the present disclosure is not limited thereto.

According to an embodiment, when the user is not recognized based at least in part on of the acquired voice information, the processor may select one of the plurality of external devices by a scheme set by default. For example, when the user is not recognized, the processor may select the external device with which the electronic device has made the communication connection most recently (or with which the electronic device was paired just previously). In another example, the processor may select the external device with which the electronic device was most frequently paired previously. In another embodiment, the processor may select the external device which is most closely located to the electronic device. In another embodiment, the processor may select a device which provides a function related to a current state or operation of the electronic device (for example, an application currently executed in the electronic device). In operation 407 according to an embodiment of the present disclosure, the processor may transmit a connection request to the selected external device to the selected external device. For example, the processor may control an interface to make a request for pairing to the selected external device (or may perform a page operation). However, although Bluetooth communication is described as an example in operation 407, the present disclosure is not limited thereto. According to aspects of the disclosure, any suitable type of short-range communication protocol (for example, ZigBee, Wi-Fi direct, or the like) may be used.

According to an embodiment, when a response to the connection request is received from the selected external device, the electronic device may establish the communication connection with the external device. For example, when a response to a connection request is received from the external device, a Service Link Connection (SLC) for Bluetooth communication may be established between the electronic device and the external device. The electronic device may communicate with the external device through the established service link.

According to an embodiment, the processor may transmit a request for activating the external device and/or a request for a connection to the external device to the external device according to whether the selected external device is in an active state.

According to an embodiment, the processor may identify a communication function activation state of the external device. For example, the processor may detect whether a Bluetooth module of the external device is in a turned-on state or a turned-off state. According to an embodiment, when it is detected that the communication function of the external device is in the active state, the processor may control a communication interface to transmit the connection request to the external device. According to another embodiment, when it is detected that the communication function of the external device is in an inactive state, the processor may control the communication interface to transmit a signal for activating the communication function of the external device and at least the part of the signal for the connection request to the external device. A more detailed description will be made below with reference to FIG. 7.

According to another embodiment, the processor may control the communication interface to transmit at least the part of the signal including at least the part of the information for activating the communication function of the external device and at least the part of the signal for the connection request to the external device without identifying the communication function activation state of the external device (or with no regard to the communication function activation state of the external device). A more detailed description will be made below with reference to FIG. 8.

Figure 5:
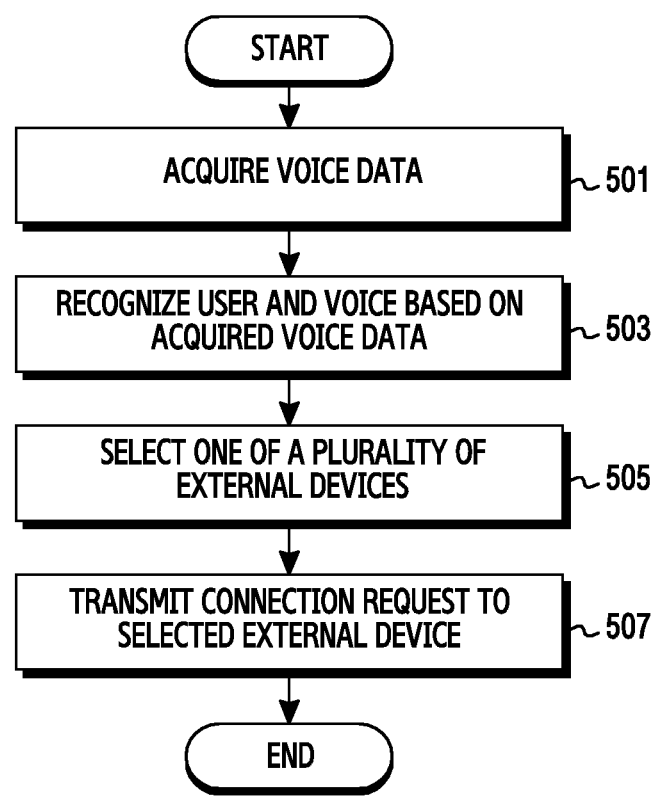
FIG. 5 is a flowchart of an example of a process, according to an embodiment of the present disclosure.

FIG. 5 is a flowchart of an example of a process, according to another embodiment of the present disclosure.

Referring to FIG. 5, a processor (for example, the processor 120) may acquire a user's voice in operation 501 according to an embodiment of the present disclosure. According to aspects of the disclosure, the processor may acquire voice data. According to aspects of the disclosure, the voice data may include a voice recording. Additionally or alternatively, the voice data may include information that identifies one or more characteristics of a user's voice.

According to aspects of the disclosure, the voice of the user may be input into a microphone (for example, the microphone 288). The microphone may convert the input voice (or, a voice signal or an analog signal) into an electric signal (or a digital signal) and transfer the converted electric signal to a processor. The processor may receive the electrical signal from the microphone and acquire at least a part of the voice. In some implementations, operation 501 may be performed in the same or similar manner as operation 401 of FIG. 4.

In operation 503 according to an embodiment of the present disclosure, the processor may recognize the user and the voice based at least in part on of the acquired voice. For example, the processor may recognize the user by analyzing a frequency characteristic of at least the part of the acquired voice and determine whether at least the part of the acquired voice is equal to a pre-stored voice data.

According to an embodiment, the processor may analyze a frequency characteristic of the acquired voice and recognize the user through a comparison between the acquired voice and a pre-stored user's voice data.

According to an embodiment, the processor may recognize a term, phrase, or sentence of the acquired voice to recognize the voice. For example, the processor may recognize phonemes by analyzing the acquired voice. The processor may recognize the term, phrase, or sentence at least based on the recognized phonemes.

According to an embodiment, the processor may use various voice recognition methods (or algorithms) for identifying the user (i.e., the source of the voice data). For example, for the user recognition, the processor 120 may use a Gaussian Mixture Model (GMM)-based user recognition method, a minimum classification error score weight-based user recognition method, or a Support Vector Machine (SVM)-based user recognition method. However, they are only examples and methods for recognizing the user are not limited thereto. In operation 505 according to an embodiment of the present disclosure, the processor may select one of a plurality of external devices at least partially based on the user and the voice recognition.

According to an embodiment, the processor may identify at least a part of information on the external device mapped to the voice (or voice contents) as well as to the recognized user among the plurality of external devices. For example, the processor may identify at least the part of the information on the external device mapped to a term, phrase, or sentence of the recognized voice based on the acquired voice. For example, the processor may identify a Bluetooth Device Address (BD_ADDR) of the external device (for example, a Bluetooth device), which is mapped to the recognized user (or an identifier corresponding to the identified user). In another example, the processor may identify a Bluetooth device name of the external device mapped to the recognized user and the recognized voice among the plurality of external devices. However, the present disclosure is not limited thereto. For example, in addition to the Bluetooth device address or the Bluetooth device name, the processor may identify additional information required for the communication connection with the external device.

According to an embodiment, the processor may select at least one external device as a device to perform the communication function based at least in part on of the identified information.

According to an embodiment, when the user or the voice is not recognized based at least in part on of the acquired voice, the processor may prompt the use to provide additional voice input. For example, when at least a part of the user voice information is different from at least a part of the registered (pre-stored) user voice information (or when user recognition fails), the processor may control the display to output a screen for inducing the user to input a voice again. In another example, when at least a part of the user or the voice is different from at least a part of the registered (or pre-stored) user's voice data, the processor may control an audio module (for example, the audio module 280) to output a voice for inducing the user to input a voice again, control a motor (for example, the motor 298) to output a vibration (or a haptic effect), or control a lamp to output a light. However, the present disclosure is not limited thereto.

According to an embodiment, when the user or the voice is not recognized based at least in part on of the acquired voice, the processor may select one of the plurality of external devices by a scheme set by default. According to another embodiment, when the voice is not recognized based at least in part on of the acquired voice, for example, when the acquired voice does not include at least one of a pre-stored (or selected) term, phrase, and sentence, the processor may select one of the plurality of external devices by the scheme set by default without recognizing the user corresponding to the acquired voice.

According to an embodiment, the processor may select the external device with which the electronic device has established a communication connection (e.g., communication session) most recently most recently. In another example, the processor may select the external device with which the electronic device was frequently paired in a predetermined past period. In another embodiment, the processor may select the external device which is most closely located to the electronic device. In another embodiment, the processor may select a device which provides a function related to a current state or operation of the electronic device (for example, an application currently executed in the electronic device).

In operation 507 according to an embodiment of the present disclosure, the processor may transmit a connection request to the selected external device. Since operation 507 for transmitting the connection request to the selected external device may be at least partially equal or similar to operation 507 for transmitting the connection request to the selected external device, an overlapping description will be omitted.

Figure 6:
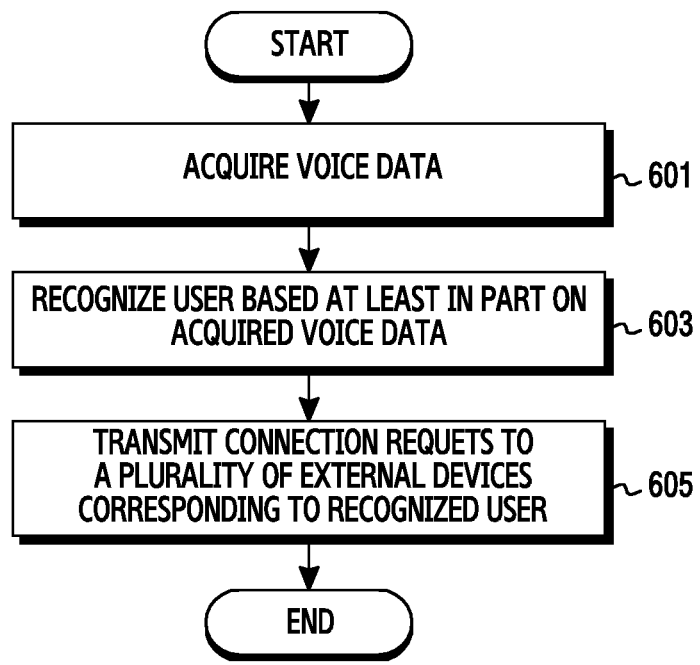
FIG. 6 is a flowchart of an example of a process, according to another embodiment of the present disclosure.

FIG. 6 is a flowchart of an example of a process, according to another embodiment of the present disclosure. According to an embodiment, FIG. 6 corresponds to a case where a user (or user voice data) and a plurality of external devices are mapped to each other and registered. According to an embodiment, when the user (or user voice data) is mapped to and registered in a plurality of external devices, the electronic device (for example, the electronic device 101) may simultaneously (or concurrently) establish communication session with the plurality of external devices by a one-time voice input.

Referring to FIG. 6, since operation 601 is at least partially similar to operation 401 of FIG. 4 and operation 603 is at least partially similar to operation 403 of FIG. 4, an overlapping description will be omitted.

In operation 605 according to an embodiment of the present disclosure, a plurality of connection requests may be transmitted to different devices associated with a user identified in operation 603. For example, each one of the plurality of connection requests may be transmitted to a different one of the devices associated with the user.

For example, when a voice acquired through the recognition operation is recognized as belonging to a first user, a processor (for example, the processor 120) may transmit a connection request to a first external device and a second external device corresponding to the recognized first user. In another example, when the acquired voice is recognized as belonging to a second user, the processor may transmit a connection request to a third external device and a fourth external device corresponding to the recognized second user. Although it has been described that the number of external devices corresponding to the user is two, the present disclosure is not limited thereto and the number of external devices corresponding to the user may be one, three, or more.

According to an embodiment, the processor may identify at least a part of information on the first external device and the second external device mapped to the recognized first user (or recognized user voice data). For example, the processor may identify Bluetooth Device Addresses (BD_ADDR) of the first external device and the second external device that are mapped to the recognized first user. In another example, the processor may identify Bluetooth device names of the first external device and the second external device mapped to the recognized first user. However, the present disclosure is not limited thereto. For example, in addition to the Bluetooth device address or the Bluetooth device name, the processor may identify additional information required for connecting to any of the plurality of external devices.

According to an embodiment, the processor may control a communication interface (for example, the communication interface 170) to make a request for the communication connections to the plurality of external devices corresponding to the user based at least in part on of the information on the plurality of external devices. For example, the processor may control an interface to make a request for pairing to the first external device and the second external device corresponding to the first user (or may perform a page operation). However, although Bluetooth communication is described as an example in operation 605, the present disclosure is not limited thereto. For example, in addition to Bluetooth communication, short-range communication (for example, ZigBee, Wi-Fi direct, or the like) may be used.

According to an embodiment, when a response to the communication connection request is received from the first external device and the second external device corresponding to the first user, the electronic device may establish the communication connections with the first external device and the second external device. For example, when a response to the communication connection is received from the first external device and the second external device, the electronic device may establish a Service Link Connection (SLC) for Bluetooth communication with each of the first external device and the second external device. The electronic device may communicate with the first external device and the second external device through the service link.

Although FIG. 6 illustrates an example in which the electronic device simultaneously (or concurrently) establishes the communication connections with the plurality of external devices through user recognition, the present disclosure is not limited thereto. For example, the electronic device may simultaneously (or concurrently) establish the communication connections with the plurality of external devices through the user and the voice recognition.

Figure 7:
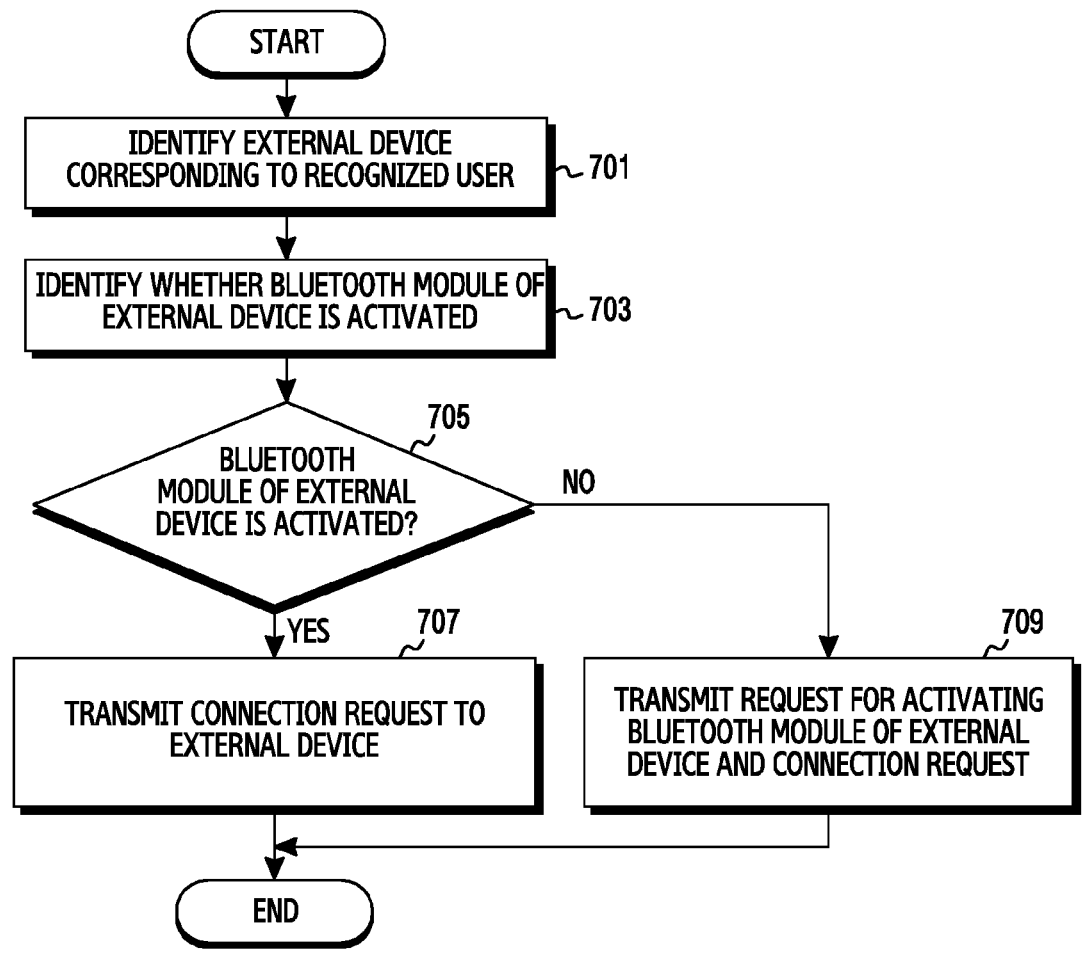
FIG. 7 is a flowchart of an example of a process, according to an embodiment of the present disclosure.

FIG. 7 is a flowchart of an example of a process, according to an embodiment of the present disclosure. Although FIG. 7 illustrates a Bluetooth communication connection and a Bluetooth Low Energy (BLE) communication connection as the communication connection with the external device, the present disclosure is not limited thereto. For example, any suitable type of short-range communication protocol may be used instead of or in addition to Bluetooth (for example, ZigBee, Wi-Fi direct, or the like).

Referring to FIG. 7, in operation 701 according to an embodiment of the present disclosure, the processor 120 may identify an external device corresponding to a recognized user. For example, the processor may identify at least a part of information related to the external device such as a Bluetooth Device Address (BD_ADDR) and/or a Bluetooth low energy device address of the external device mapped to the recognized user. According to an embodiment, at least the part of the information related to the external device such as the Bluetooth device address and/or the Bluetooth low energy device address of the external device may be mapped to a user (or user voice data) information and stored in a memory (for example, the memory 130). According to another example, at least the part of the information related to the external device may be stored in a server based on user account information. In another example, the processor may identify a Bluetooth device name and a Bluetooth low energy device name of the external device mapped to the recognized user. According to an embodiment, the Bluetooth device name may be the same as the Bluetooth low energy device name.

In operation 703 according to an embodiment of the present disclosure, the processor may detect whether a Bluetooth module of the external device is activated.

According to an embodiment, the processor may control a Bluetooth low energy module (for example, the BLE module 226) to establish Bluetooth low energy communication between the electronic device (for example, the electronic device 101) and the external device. For example, the processor may control the Bluetooth low energy module to transmit an advertising signal to the external device by using a Generic Access Profile (GAP) of the Bluetooth low energy communication. When a response signal (for example, SCAN RESPONSE REQUEST) is received from the external device, the electronic device may establish the Bluetooth low energy communication with the external device.

According to an embodiment, when the external device is within a predetermined distance from the electronic device, the processor may control the Bluetooth low energy module to establish the Bluetooth low energy communication connection between the electronic device and the external device. For example, when the electronic device and the external device are within a Bluetooth low energy communicable distance (for example, 50 m) from each other, the processor may control the Bluetooth low energy module to establish the Bluetooth low energy communication connection between the electronic device and the external device.

However, the Bluetooth low energy communication connection between the electronic device and the external device is not limited to the above described example. For example, the Bluetooth low energy communication connection between the electronic device and the external device may be established before the communication connection function using the user recognition is performed or after at least the part of the user's voice is acquired.

According to an embodiment, the processor may detect whether the Bluetooth module of the external device is activated based on a Generic Attribute Profile (GATT) of the Bluetooth low energy communication. For example, based on services or characteristics of the electronic device and the external device, the processor may control the Bluetooth low energy module to transmit at least a part of a signal for making a request for identifying whether the Bluetooth module of the external device is activated. According to an embodiment, the processor may receive, from the external device, information indicating whether the Bluetooth module of the external device is activated, for example, whether the Bluetooth module of the external device is in a turned-on state or a turned-off state.

According to an embodiment, when the Bluetooth module of the external device is in the active state, if the external device identifies that the external device does not store registration information (for example, the Bluetooth device address (BD_ADDR) and the Bluetooth device name) mapped to the electronic device, the external device may acquire the registration information (or the Bluetooth device address (BD_ADDR) and the Bluetooth device name) of the electronic device through a smart pairing application. According to an embodiment, when the external device does not store at least a part of the registration information mapped to the electronic device, it may mean that the external device deletes (or deregister) the Bluetooth device name for the Bluetooth communication connection after the Bluetooth connection is established between the external device and the electronic device. According to an embodiment, the external device may store at least a part of the registration information of the electronic device and transmit, through the Bluetooth low energy module of the external device, information indicating that the Bluetooth module of the external device is in the turned-on state to the electronic device.

According to another embodiment, when the Bluetooth module of the external device is in the active state, if the external device identifies that the external device stores at least the part of the registration information mapped to the electronic device, the external device may transmit, through the Bluetooth low energy module of the external device, at least the part of the signal including at least the part of the information indicating that the Bluetooth module of the external device is in the turned-on state to the electronic device.

When it is detected that the Bluetooth module of the external device is in the active state in operation 705 according to an embodiment of the present disclosure, a request for establishing a connection may be transmitted to the external device, in operation 707. For example, the processor may control the Bluetooth module (for example, Bluetooth module 225) to make a request for the Bluetooth communication connection to the external device.

According to an embodiment, when it is detected that the Bluetooth module of the external device is in the active state, the processor may control the Bluetooth low energy module to release the Bluetooth low energy communication connection between the electronic device and the external device.

According to another embodiment, when it is detected that the Bluetooth module of the external device is in the active state, the processor may turn off the Bluetooth low energy module to release the Bluetooth low energy communication connection between the electronic device and the external device.

When it is identified that the Bluetooth module of the external device is in the inactive state in operation 705 according to an embodiment of the present disclosure, a signal for activating the Bluetooth module of the external device may be transmitted to the external device along with a connection request, in operation 709 according to an embodiment of the present disclosure. For example, the processor may control the Bluetooth low energy module to make a request for activating the Bluetooth module of the external device to the external device and control the Bluetooth module to make a request for the Bluetooth communication connection between the electronic device and the external device.

For example, the processor may control the Bluetooth low energy module to transmit a request for activating the Bluetooth module of the external device, to the external device. According to an embodiment, when at least the part of the signal including at least the part of the information indicating that the Bluetooth module of the external device is activated is received from the external device, the processor may control the Bluetooth module to transmit at least the part of the signal for making the request for the Bluetooth communication connection to the external device.

According to an embodiment, the processor may control the Bluetooth low energy module to release the Bluetooth low energy communication connection between the electronic device and the external device. According to another embodiment, when at least the part of the signal including at least the part of the information indicating that the Bluetooth module of the external device is activated is received from the external device, the processor may turn off the Bluetooth low energy module to release the Bluetooth low energy communication connection between the electronic device and the external device.

Although not illustrated in FIG. 7, when a response to the communication connection request is received from the external device, a Service Link Connection (SLC) for Bluetooth communication between the electronic device and the external device may be established. The electronic device may communicate with the external device through the established service link.

Figure 8:
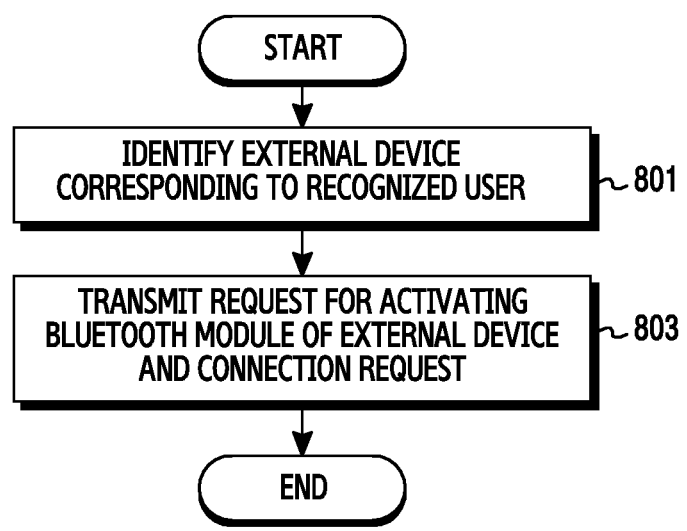
FIG. 8 is a flowchart of an example of a process, according to another embodiment of the present disclosure.

FIG. 8 is a flowchart of an example of a process, according to another embodiment of the present disclosure.

Referring to FIG. 8, in operation 801 according to an embodiment of the present disclosure, a processor (for example, the processor 120) may identify an external device corresponding to a recognized user. For example, the processor may identify a Bluetooth Device Address (BD_ADDR) and/or a Bluetooth low energy device address of the external device mapped to the recognized user. According to an embodiment, the Bluetooth device address and the Bluetooth low energy device address of the external device may be mapped to a user (or user voice data) and stored in a memory (for example, the memory 130). According to another embodiment, the Bluetooth device address and the Bluetooth low energy device address of the external device may be mapped to the user (or user voice data) and stored in a server (for example, a cloud server). For example, when the server is a server which provides a communication connection service using user recognition, the electronic device may access the server through an account and receive the Bluetooth device address and the Bluetooth low energy device address of the external device, which is stored in the server and mapped to the user, from the server. In another example, the processor may identify a Bluetooth device name and a Bluetooth low energy device name of the external device mapped to the recognized user. According to an embodiment, the Bluetooth device name may be the same as the Bluetooth low energy device name.

In operation 803 according to an embodiment of the present disclosure, the processor may control a Bluetooth low energy module (for example, the Bluetooth low energy module 226) and a Bluetooth module (for example, the Bluetooth module 225) to transmit a request for activation of the Bluetooth module of the external device and establishing a connection with the external device.

According to an embodiment, the processor may control the Bluetooth low energy module to broadcast a request for activating the Bluetooth module of the external device. According to an embodiment, at least a part of the information for making a request for activating the Bluetooth module of the external device may include an identifier (Unique User IDentifier (UUID) defined (appointed) between the electronic device and the external device to be distinguished from other information.

According to an embodiment, the external device may identify at least the part of the information for making the request for activating the Bluetooth module of the external device based on the UUID and detect whether the Bluetooth module of the external device is in an active state.

According to an embodiment, when the Bluetooth module of the external device is in the active state, if the external device identifies that the external device stores at least a part of registration information mapped to the electronic device, the external device may transmit a response signal for permitting the Bluetooth low energy communication connection to the electronic device.

According to another embodiment, when the Bluetooth module of the external device is in the active state, if the external device identifies that the external device does not store at least the part of the registration information mapped to the electronic device, the external device may acquire at least a part of the registration information of the electronic device (or a Bluetooth device address (BD_ADDR) and a Bluetooth device name) from a smart pairing application. According to an embodiment, when the external device does not store at least the part of the registration information mapped to the electronic device, it may mean that the external device deletes (or deregisters) the Bluetooth device name for the Bluetooth communication connection after the Bluetooth connection is established between the external device and the electronic device. According to an embodiment, the external device may store (or register) at least the part of the registration information for the Bluetooth connection of the electronic device.

According to an embodiment, when the external device receives a request for establishing the Bluetooth low energy communication connection and activating the Bluetooth module of the external device, from the electronic device when the Bluetooth module of the external device is deactivated (or when the Bluetooth module is turned off), the external device may activate the Bluetooth module of the external device.

According to an embodiment, the processor may control the Bluetooth module to transmit a request for establishing the Bluetooth communication connection, to the external device after a predetermined delay time from the time when the request for establishing the Bluetooth low energy communication connection and activating the Bluetooth module, is broadcasted to the external device.

Although not illustrated in FIG. 8, when a response to the communication connection is received from the external device, a Service Link Connection (SLC) for Bluetooth communication between the electronic device and the external device may be established. The electronic device may communicate with the external device through the established service link.

Figure 9:
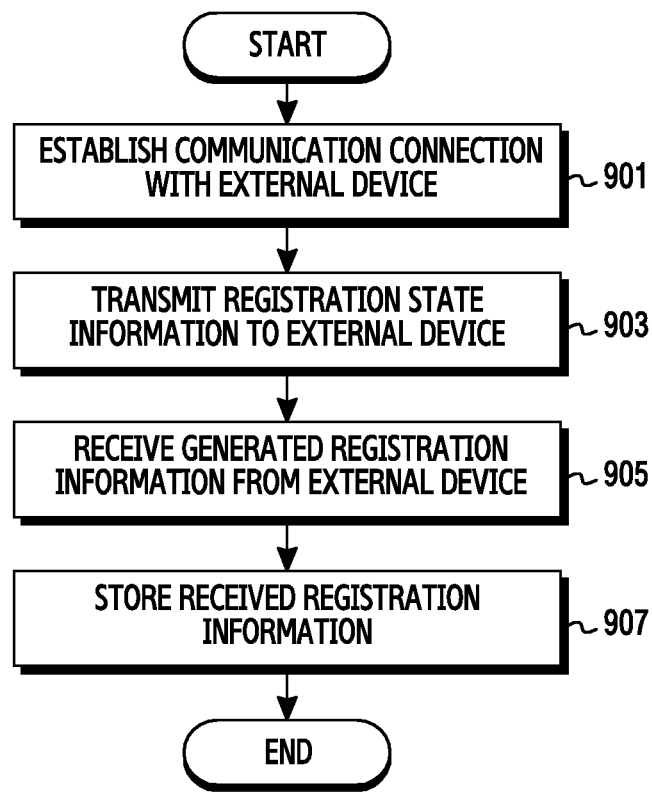
FIG. 9 is a flowchart of an example of a process, according to an embodiment of the present disclosure.

FIG. 9 is a flowchart of an example of a process, according to an embodiment of the present disclosure.

Referring to FIG. 9, in operation 901 according to an embodiment of the present disclosure, the electronic device may establish a communication session with an external device. For example, a processor (for example, the processor 120) may control a communication interface (for example, the communication interface 170) to allow the electronic device (for example, the electronic device 101) to establish a communication connection with the external device. According to an embodiment, the electronic device may be a headset, an earphone device, or a speaker, and the external device may be at least one of a smart phone, a tablet PC, a television, a robot, an infotainment system of a car, a head unit of a car, a mobile phone, a video phone, a desktop PC, a laptop PC, and a netbook computer. According to another embodiment, the electronic device may be a smart phone, and the external device may be at least one of a smart phone accessory device, a tablet PC, a television, a robot, an infotainment system of a car, a head unit of a car, a mobile phone, a video phone, a desktop PC, a laptop PC, and a netbook computer.

According to an embodiment, the processor may control a Bluetooth module (for example, the Bluetooth module 225) to allow the electronic device to establish a Bluetooth communication connection with the external device. For example, under a control of the processor, the electronic device may set a frequency hopping sequence and broadcast an inquiry signal to search for external devices. The external device having scanned for the inquiry signal may be synchronized with a frequency of the inquiry signal and transmit a Bluetooth device address (BD_ADDR) of the external device to the electronic device. According to an embodiment, under a control of the processor, the electronic device may transmit a request for a device name of, to the external device and receive an indication of the device name of the external device from the external device. According to an embodiment, when an input for selecting a Bluetooth communication connection with the external device is received from the user, the electronic device may transmit a request for establishing a Bluetooth communication session, to the external device and receive a response to the request, after which the Bluetooth communication session may be established.

However, the communication connection between the electronic device and the external device is not limited to using any particular protocol. For example, the communication between the electronic device and the external device may be established by using any suitable type of wireless and/or wired communication protocol such as Wireless Local Area Network (WLAN) using frequency bands of 2.4 GHz and 5 GHz, millimeter wave communication using millimeter wave frequency bands (for example, 60 GHz, 28 GHz, 32 GHz, and 38 GHz), Wide Area Network (WAN), cellular communication, and mobile communication (for example, 3G, 4G, LTE, and LTE-A).

According to an embodiment, in order to transmit/receive at least a part of signals to/from the external device through Bluetooth communication, the electronic device may use a Serial Port Profile (SPP).

Although the Bluetooth communication is described as an example in operation 901 according to an embodiment of the present disclosure, the technical idea of the present disclosure is not limited thereto. For example, in addition to Bluetooth communication, short-range communication (for example, ZigBee, Wi-Fi direct, or the like) may be used. In operation 903 according to an embodiment of the present disclosure, the electronic device may perform an operation for transmitting registration state information to the external device. For example, the electronic device may transmit at least a part of the registration state information to the external device under a control of the processor. According to an embodiment, the processor may identify a registration state stored in the electronic device and transmit at least the part of the identified registration state information to the external device. According to an embodiment, the registration state information may include at least a part of information related to a communication connection function (or smart pairing function) using user recognition, and information related to the smart pairing function may include registration state information of smart pairing. For example, the registration state information may be information indicating whether there is at least a part of registration information between the electronic device and the external device. For example, at least the part of the registration information may be at least a part of information on a stored user or selectively a stored voice mapped to at least a part of the external device (or information (for example, Bluetooth device name) required for the Bluetooth communication connection such as a Bluetooth device address of the external device) in order to perform the communication function using the user recognition. For example, at least the part of the registration state information may be at least a part of information for identifying whether information, in which the external device is mapped to at least the part of the information (for example, the Bluetooth device address or the Bluetooth device name of the external device) required for the communication connection with the external device, is pre-registered (or stored) in the electronic device.

According to an embodiment, when it is detected that there is at least the part of the registration information between the electronic device and the external device, the processor may control the Bluetooth module to transmit at least the part of the registration state information or at least the part of the registration information to the external device.

According to an embodiment, the processor may control the Bluetooth module to transmit, to the external device, at least a part of information (hereinafter, referred to as a "fixed trigger of the electronic device") on a voice (or voice text) set to perform another function of the electronic device through voice recognition along with at least the part of the registration state information. For example, when a voice is input by the user without user recognition (or identification) (or regardless of the user), the fixed trigger of the electronic device may be at least a part of information related to a voice (or voice text) designated to execute another function (for example, a memo function) of the electronic device based on voice recognition. For example, when the fixed trigger is "memo" text, if the user says "memo", the electronic device may extract the "memo" text recognized through voice recognition and execute a function (for example, memo function) designated to the "memo" text. According to an embodiment, the fixed trigger may be set by a designer's intention when the electronic device is designed or by user's settings. For example, the fixed trigger may design a function executed when the designer inputs the fixed trigger in designing the electronic device. In another example, the fixed trigger having a function designated thereto may have another function by a user input. For example, when the fixed trigger is the "memo" text, the electronic device may be designated to execute a "calendar function" by a user input.

According to an embodiment, the processor may identify at least a part of a registration state of the electronic device and control a display (for example, the display 160) to display information based at least in part on of information related to the identified registration state of the electronic device. For example, the processor may control the display to output information on whether the communication connection function using the user recognition through the electronic device is activated. In another example, the processor may control the display to output a voice registered between the electronic device and the external device with respect to the communication connection function using the user recognition or to output a list of voices registered between the electronic device and a plurality of external devices. In another example, the processor may control the display to output a list of fixed triggers of the electronic device.

In operation 905 according to an embodiment of the present disclosure, the electronic device may perform an operation for receiving the generated registration information from the external device. For example, the electronic device may receive at least a part of the registration information of the communication connection function (or smart pairing function) using the user recognition, which is generated by the external device. For example, the electronic device may receive from the external device registration information to which voice data associated with the user and/or external device information is mapped.

In operation 907 according to an embodiment of the present disclosure, the electronic device may store at least the part of the received registration information. For example, the electronic device may store the received registration information in a memory (for example, the memory 130), for example, a Nonvolatile Random Access Memory (NVRAM).

Although not illustrated in FIG. 9, the electronic device may receive a request for activing the communication connection function using the user recognition of the electronic device, from the external device in FIG. 9. According to an embodiment, when the electronic device receives the request for activing the communication connection function using the user recognition, from the external device, the electronic device may activate the communication connection function using the user recognition. According to an embodiment, when the electronic device activates the communication connection function using the user recognition, the electronic device may record activation of the communication connection function using the user recognition through a flag setting of the NVRAM. According to an embodiment, when the electronic device switches from a power-off (or turned-off) state to a power-on (turned-on) state, the electronic device may detect whether the communication connection function using the user recognition is in the active state as the electronic device records activation or deactivation of the communication function using the user recognition through the flag setting of the NVRAM.

Figure 10:
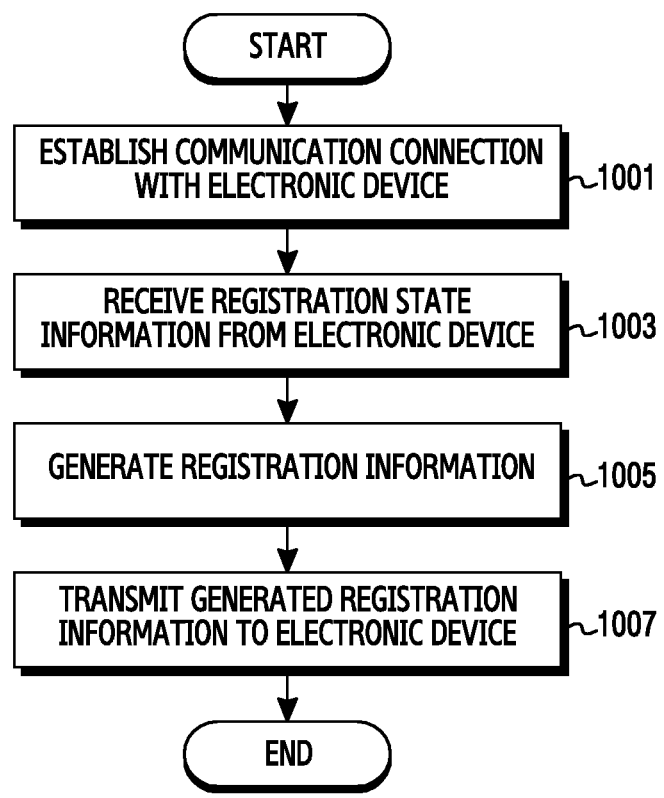
FIG. 10 is a flowchart of an example of a process, according to an embodiment of the present disclosure.

FIG. 10 is a flowchart of an example of a process, according to an embodiment of the present disclosure.

According to an embodiment, the electronic device may be a headset, an earphone device, or a speaker, and the external device may be a smart phone, a tablet PC, a television, a robot, an infotainment system of a car, a head unit of a car, a mobile phone, a video phone, a desktop PC, a laptop PC, and a netbook computer. According to an embodiment, the electronic device may be a smart phone, and the external device may be at least one of a smart phone accessory device, a tablet PC, a television, a robot, an infotainment system of a car, a head unit of a car, a mobile phone, a video phone, a desktop PC, a laptop PC, and a netbook computer.

Referring to FIG. 10, in operation 1001 according to an embodiment of the present disclosure, an external device may establish a communication session with an electronic device (for example, the electronic device 101). For example, the external device may establish a Bluetooth communication connection with the electronic device. For example, the external device may scan for an inquiry signal to search for the external device from the electronic device. The external device may transmit a Bluetooth device address (BD_ADDR) of the external device to the electronic device in response to the inquiry signal. According to an embodiment, when the external device receives a request for a device name of the external device, the external device may transmit at least a part of a signal including information on the device name of the external device to the electronic device. According to an embodiment, as the external device receives the request for the Bluetooth communication connection, from the electronic device and transmits at least a part of a response signal to the electronic device in response to the received request for the Bluetooth communication connection, the external device may establish the Bluetooth communication connection with the electronic device. However, although the Bluetooth communication is illustrated as an example in operation 1001, the technical idea of the present disclosure is not limited thereto.

For example, any suitable type of wired or wireless communication protocol may be used instead of Bluetooth, such as a Wireless Local Area Network (WLAN) using frequency bands of 2.4 GHz and 5 GHz, millimeter wave communication using millimeter wave frequency bands (for example, 60 GHz, 28 GHz, 32 GHz, and 38 GHz), Wide Area Network (WAN), cellular communication, and mobile communication (for example, 3G, 4G, LTE, and LTE-A).

In operation 1003 according to an embodiment of the present disclosure, the external device may receive at least a part of registration state information from the electronic device. According to an embodiment, the external device may receive at least the part of the registration state information, at least a part of information on a registered voice, and a fixed trigger (or list of fixed triggers) from the electronic device. According to an embodiment, at least the part of the registration state information may include at least a part of information indicating whether there is at least a part of voice information registered between the electronic device and the external device with respect to the communication connection function (or smart pairing function) using user recognition. For example, at least the part of the registered voice information may include stored voice information mapped to at least a part of the external device (or information (for example, Bluetooth device name) required for the Bluetooth communication connection such as a Bluetooth device address of the external device) in order to perform the communication function using the user recognition. For example, at least the part of the registration state information may be at least a part of information for identifying whether information, in which the external device is mapped to at least the part of the information (for example, the Bluetooth device address or the Bluetooth device name of the external device) required for the communication connection with the external device, is pre-registered (or stored) in the electronic device.

According to an embodiment, the external device may transfer at least the part of the received registration state information to a communication connection function application, for example, a smart pairing application using the user recognition.

In operation 1005 according to an embodiment of the present disclosure, the external device may generate registration information.

According to an embodiment, the external device may execute the communication connection function application using the user recognition based on a user input. According to an embodiment, a least the part of the registration information may be information mapped to (or combined with) at least a part of a voice for the communication connection function using the user recognition and communication connection information of the external device (for example, a Bluetooth device address and a Bluetooth device name of the external device).

According to an embodiment, the external device may generate the registration information in various ways. For example, when a first user's voice including a predetermined voice message (for example, "Hi Samsung") is input through a microphone, the external device may recognize the first user or selectively the voice (or voice contents) and map the recognized information and communication connection information of the external device, so as to generate the registration information. For example, the external device may extract a waveform or a frequency characteristic of the first user's voice by analyzing the voice input through the microphone. In another example, the external device may extract at least one of a phoneme, term, phrase, and sentence at least based on the input voice as well as the waveform and the frequency characteristic of the first user's voice. The external device may generate the registration information by mapping the extracted waveform and frequency characteristic of the voice or selectively at least one of the term, phrase, and sentence to the communication connection information of the external device.

According to an embodiment, the external device may generate the registration information based on a voice received through a microphone of another external device as well as the microphone of the external device. For example, the external device may receive the voice input through the microphone of the other external device from the other external device. The external device may generate the registration information by mapping the user or selectively the voice (or voice contents) to the external device at least based on the voice received from the other external device.

In another example, the external device may generate the registration information by using a fixed trigger of the electronic device 101. For example, when the fixed trigger is a trigger for performing a "memo" function, the external device may generate the registration information by mapping a "memo" voice to communication connection information of the external device for the communication connection with the external device if a "memo" voice is input by the user. In another example, when the fixed trigger is a trigger designated to perform a communication connection function with a first external device, which is different from the external device, the external device may generate the registration information by mapping the fixed trigger to the communication connection information of the external device. For example, when the trigger designated to perform the communication connection function with the first external device is "Circle", if a "Circle" voice message is input by the user, the external device may map the trigger to the communication connection information of the external device.

In another example, the external device may generate the registration information by using the fixed trigger of the external device. For example, the external device may generate the registration information by mapping a trigger designated to perform another function to the communication connection information of the external device.

In another example, the external device may generate (or use) a pre-stored voice data (e.g., voice template) as the registration information. For example, when a voice including a characteristic of a voice of the user, which is distinguished from another user, is pre-stored, the external device may generate the registration information by mapping the pre-stored voice data (e.g., voice template) to the communication connection information of the external device.

According to an embodiment, the external device may recommend a trigger for generating the registration information as well as the fixed trigger. For example, the external device may recommend a trigger such as "Hi, Galaxy", "Hi, Circle", or "Hi Gear" to the user.

According to an embodiment, when the external device generates the registration information by a user's speaking, the external device may receive a user voice of the user a predetermined number of times (for example, five times) or more. For example, the external device may control a display (for example, the display 160) to output a screen for inducing the user to make a user voice input a predetermined number of times or more.

According to an embodiment, the external device may output a menu for selecting a method of generating at least a part of the registration information. For example, the external device may control the display to output, through a menu item, a method of generating at least the part of the registration information by using a voice including predetermined contents, a method of generating at least the part of the registration information by using a fixed trigger of the electronic device, a method of generating at least the part of the registration information by using a fixed trigger of the external device, and a method of generating the registration information by using a pre-stored voice data.

According to another embodiment, the external device may not generate at least the part of the registration information according to at least a part of registration state information received from the electronic device. For example, it is identified that there is at least the part of the registration information stored in the electronic device based at least in part on of the registration state information and when at least the part of the registration information stored in the electronic device is continuously used without any change, the external device may not newly generate at least the part of the registration information.

In operation 1007 according to an embodiment of the present disclosure, the external device may transmit at least the part of the generated registration information to the electronic device.

According to an embodiment, in order to transmit/receive at least a part of signals to/from the electronic device through Bluetooth communication, the external device may use a Serial Port Profile (SPP).

Although not illustrated in FIG. 10, when a communication connection function using user recognition is activated in an external device according to an embodiment, the external device may transmit at least a part of information, which makes a request for activating the communication connection function using the user recognition, to an electronic device.

Figure 11:
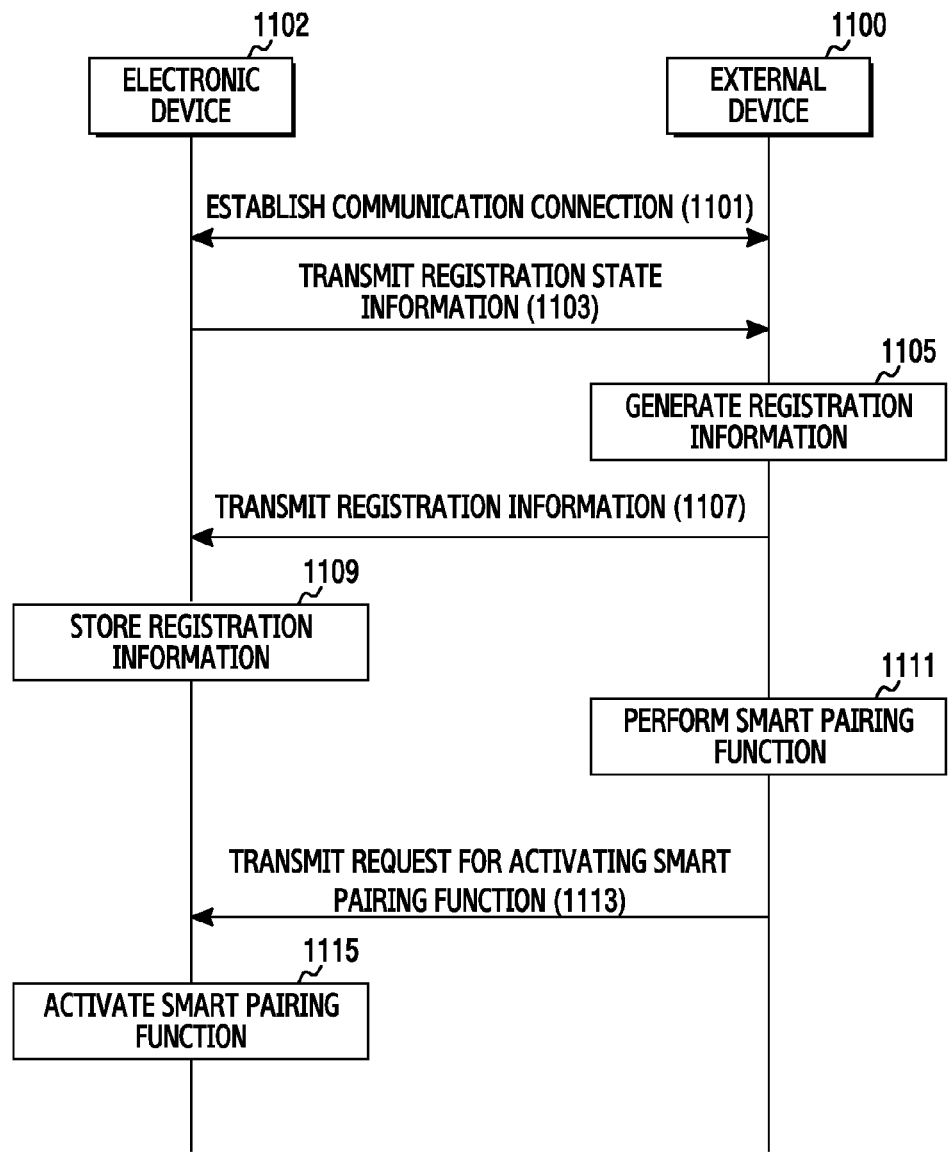
FIG. 11 is a flowchart of an example of a process, according to an embodiment of the present disclosure.

FIG. 11 is a flowchart of an example of a process, according to an embodiment of the present disclosure.

FIG. 11 may be at least partially equal or similar to FIGS. 9 and 10, and an overlapping description thereof will be omitted.

In operation 1101 according to an embodiment of the present disclosure, an electronic device 1102 and an external device 1100 may establish a communication connection.

According to an embodiment, the electronic device may be a headset, an earphone device, or a speaker, and the external device may be a smart phone, a tablet PC, a television, a robot, an infotainment system of a car, a head unit of a car, a mobile phone, a video phone, a desktop PC, a laptop, and a netbook computer. According to an embodiment, the electronic device may be a smart phone, and the external device may be at least one of a smart phone accessory device, a tablet PC, a television, a robot, an infotainment system of a car, a head unit of a car, a mobile phone, a video phone, a desktop PC, a laptop PC, and a netbook computer According to an embodiment, the electronic device 1102 and the external device 1100 may be connected to each other through Bluetooth communication. However, the communication connection between the electronic device and the external device is not limited thereto. For example, the communication between the electronic device and the external device may include any suitable type of wired or wireless communication protocol, such as Wireless Local Area Network (WLAN) using frequency bands of 2.4 GHz and 5 GHz, millimeter wave communication using millimeter wave frequency bands (for example, 60 GHz, 28 GHz, 32 GHz, and 38 GHz), Wide Areas Network (WAN), cellular communication, and mobile communication (for example, 3G, 4G, LTE, and LTE-A).

Although not illustrated in FIG. 11, FIG. 11 may further include activating a communication connection function (or smart pairing function) using user recognition. For example, when an input for activating a smart pairing application is received from the user, the processor may activate the smart pairing function. However, the present disclosure is not limited thereto. For example, when power is supplied to the electronic device 1102 and each element of the electronic device is initialized, the processor may automatically activate the smart pairing function according to settings.

According to an embodiment, when the smart pairing function is activated in the electronic device, the electronic device may display triggers for performing the smart pairing function and a list of external devices mapped to the triggers. According to another embodiment, the electronic device may display a list of external devices communication-connected for performing the smart pairing function.

In operation 1103 according to an embodiment of the present disclosure, the electronic device 1102 may transmit at least a part of registration state information to the external device 1100.

According to an embodiment, the electronic device 1102 may transmit a fixed trigger of the electronic device 1102 to the external device 1100.

In operation 1105 according to an embodiment of the present disclosure, the external device 1100 may generate at least a part of registration information. According to an embodiment, the external device 1100 may generate the registration information. For example, the external device 1100 may generate the registration information based on a user's voice including predetermined voice text, generate the registration information by using a fixed trigger of the electronic device 1102 or a fixed trigger of the external device 1100, or generate the registration information by using pre-stored voice data.

In operation 1107, the external device 1100 may transmit at least the part of the registration information to the electronic device 1102. For example, the external device 1100 may transmit at least the part of the registration information to the electronic device 1102 by using an SPP profile.

In operation 1109 according to an embodiment of the present disclosure, the electronic device 1102 may store at least the part of the registration information. For example, the electronic device 1102 may store at least the part of the received registration information in the memory 130, for example, a Nonvolatile Random Access Memory (NVRAM).

In operation 1111 according to an embodiment of the present disclosure, the external device 1100 may perform (or activate) the smart pairing function. For example, the external device 1100 may perform (or activate) the smart pairing function according to a user input or a predetermined schedule.

In operation 1113 according to an embodiment of the present disclosure, the external device 1100 may transmit at least a part of a request for activating the smart pairing function, to the electronic device 1102.

When the electronic device 1102 receives a request for activating the smart pairing function, from the external device 1100, the electronic device 1102 may activate the smart pairing function based at least in part on of the received signal in operation 1115.

Figure 12:
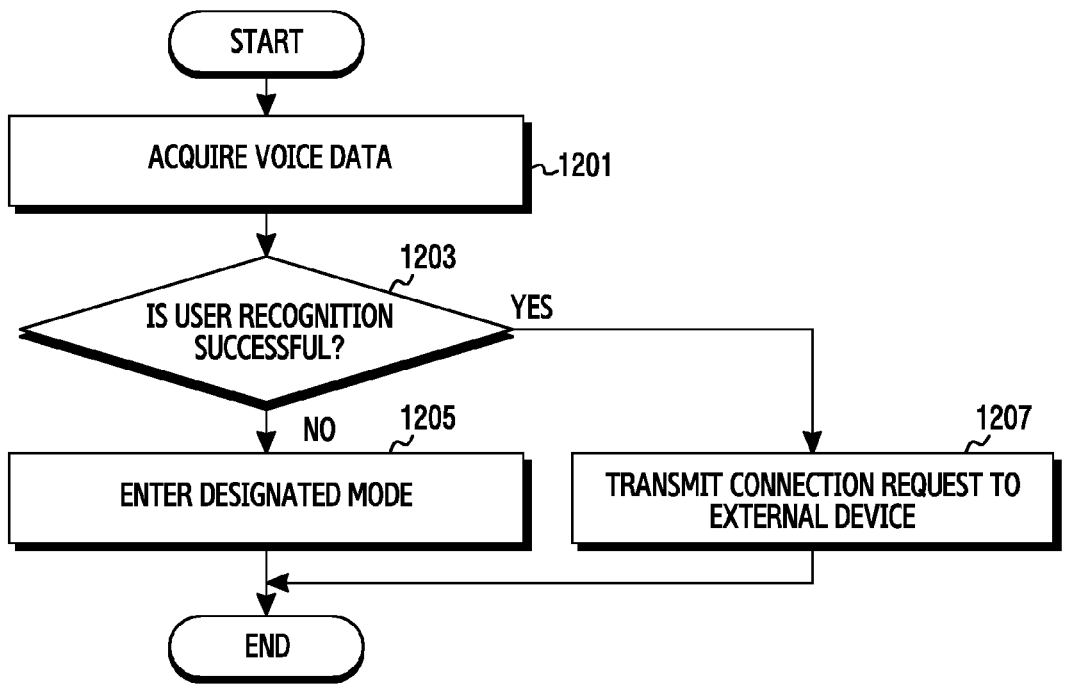
FIG. 12 is a flowchart of an example of a process, according an embodiment of the present disclosure.

FIG. 12 is a flowchart of an example of a process, according to an embodiment of the present disclosure.

Referring to FIG. 12, in operation 1201 according to an embodiment of the present disclosure, a processor (for example, the processor 120) may acquire voice data from the user. According to aspects of the disclosure, operation 1201 may be performed in the same or similar manner to operation 401.

In operation 1203 according to an embodiment of the present disclosure, the processor may determine whether user recognition based on the acquired voice is successful.

For example, the processor may determine whether the acquired voice corresponds to a user's voice registered for a smart pairing function.

According to an embodiment, the processor may use various voice recognition techniques for identifying the user (i.e., the source of the voice data). For example, for the user recognition, the processor may use a Gaussian Mixture Model (GMM)-based user recognition method, a minimum classification error score weight-based user recognition method, or a Support Vector Machine (SVM)-based user recognition method. However, they are only examples and methods for recognizing the user are not limited thereto.

When the user recognition is successful based on a result of the determination of operation 1203, the processor may transmit a request for establishing a connection with the external device in operation 1207. According to an embodiment, when at least a part of a signal, which responds to the communication connection request, is received from the external device, the processor may control a communication interface (for example, the communication interface 170) to establish the communication connection with the external device.

When the user recognition fails based on a result of the determination of operation 1203, the processor may enter a designated mode in operation 1209 according to an embodiment of the present disclosure. For example, when the user cannot be identified based on the acquired voice data, the processor may execute a designated communication connection mode. For example, when the user cannot be identified, the processor may cause the electronic device to enter a mode in which a communication connection is established with an external device, with which the electronic device most recently established a communication connection. In another example, when the user cannot be identified, for example, when the processor fails the user recognition a predetermined number of times (for example, five times) or more, the processor may enter a mode in which the communication connection is limited such that only communication connections with external devices registered for the smart pairing function are permitted and communication connections with other external devices except for the external devices registered for the smart pairing function are not permitted. For example, when the processor fails the user recognition for a communication connection with a first registered external device, the processor may permit an attempt at the user recognition for a communication connection with a second registered external device and when, the user recognition for the second external device is successful, establish the communication connection with the second external device. In another example, the processor may limit a communication connection with a third external device, which has not registered the smart pairing function.

In another example, when the processor fails the user recognition a predetermined number of times or more, the processor may enter a mode in which the communication connection is limited such that the communication connection with the external device including the external device registered for the smart pairing function is not permitted.

According to an embodiment, when the processor succeeds in the user recognition for the external device, for which the user recognition had failed, when the communication connection is limited since the user recognition has failed a predetermined number of times or more, the processor may release the limit of the communication connection.

Figure 13:
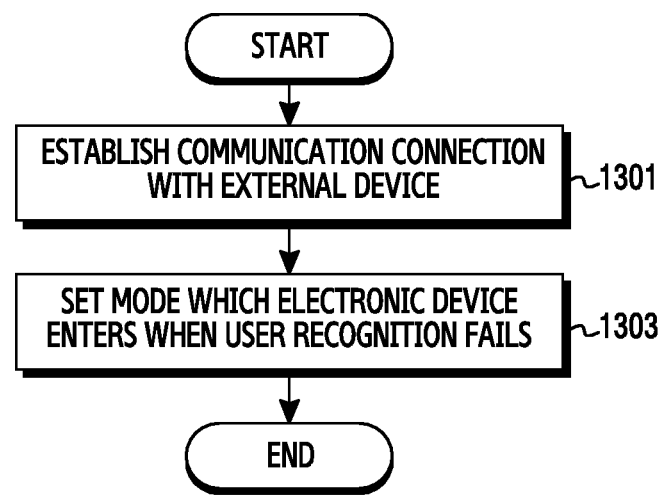
FIG. 13 is a flowchart of an example of a process, according an embodiment of the present disclosure.

FIG. 13 is a flowchart of an example of a process, according to an embodiment of the present disclosure.

Referring to FIG. 13, in operation 1301 according to an embodiment of the present disclosure, the electronic device may establish a connection with the external device. For example, a processor (for example, the processor 120) may control a communication interface (for example, the communication interface 170) to allow the electronic device (for example, the electronic device 101) to establish a communication connection with the external device. According to an embodiment, the processor may control a Bluetooth module (for example, the Bluetooth module 225) to allow the electronic device to establish a Bluetooth communication connection with the external device. However, the present disclosure is not limited thereto and, in addition to Bluetooth communication, short-range communication (for example, ZigBee, Wi-Fi direct, or the like) may be used.

In operation 1303 according to an embodiment of the present disclosure, the processor may set a mode which the processor enters when user recognition fails. According to an embodiment, the processor may set a mode which the processor enters when the user recognition fails if a smart pairing function is activated.

According to an embodiment, when the user is not recognized, the processor may set a mode to establish a communication connection with an external device, with which the electronic device most recently established a communication connection.

According to another embodiment, when the user is not recognized, for example, when the processor fails the user recognition a predetermined number of times (for example, five times) or more, the processor may set a mode in which the communication connection is limited such that only communication connections with external devices registered for the smart pairing function are permitted and communication connections with other external devices except for the external devices registered for the smart pairing function are not permitted.

According to another embodiment, when the processor fails the user recognition a predetermined number of times or more, the processor may set a mode in which the communication connection is limited such that the communication connection with the external device including the external device registered for the smart pairing function is not permitted.

According to an embodiment, when a mode which the processor enters when the user recognition fails is set, the processor may activate a function for entering the set mode when the user recognition fails.

According to an embodiment, the processor may control a display (for example, the display 160) to output a menu screen for selecting the mode which the processor enters when the user recognition fails.

FIG. 14 illustrates an example for describing a communication function setting of the external device according to an embodiment of the present disclosure.

Figures 14A, 14B:
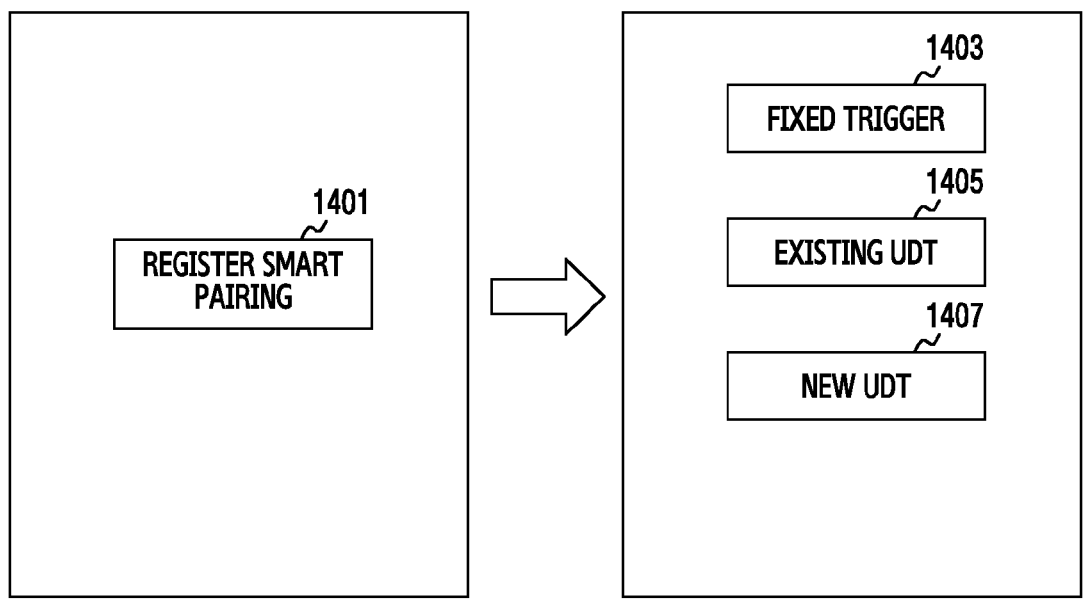
FIG. 14A is a diagram of an example of a user interface, according to an embodiment of the present disclosure.
FIG. 14B is a diagram of an example of a user interface, according to an embodiment of the present disclosure.

FIGS. 14A-B are diagrams of an example of a user interface, according to an embodiment of the present disclosure.

According to an embodiment, the external device may display a menu 1401 (for example, a button) for registering smart pairing on the screen in FIG. 14A. When a user input related to the displayed menu 1401 is received, the external device may control the display to output menus (for example, buttons) for selecting a method of generating at least a part of registration information in FIG. 14B. However, the menus for selecting the method of generating at least the part of the registration information are not limited thereto. For example, the external device may output at least one of text, icon, and voice. In another example, the external device may output menus in various types such as pop-up, quick panel, and multi-window as well as a list.

For example, the external device may control the display (for example, the display 160) to output a button (fixed trigger) 1403 for generating the registration information by using a fixed trigger of the electronic device received from the electronic device (for example, the electronic device 101) or a fixed trigger of the external device, a button (existing User Defined Trigger (UDT)) 1405 for generating the registration information by using a pre-stored voice data, and a button (new UDT) 1407 for acquiring a predetermined voice of the user and generating at least a part of the registration information by using the acquired voice. However, the present disclosure is not limited thereto. For example, when it is detected that there is at least the part of the registered information pre-stored in the electronic device through at least the part of the registration state information received from the electronic device 101, the external device may control the display to further output a button for selecting the continuous use of at least the part of pre-stored registration information for the smart pairing function. In another example, a trigger may be recommended based at least in part on of information on the electronic device. For example, the external device may recommend a trigger such as "Hi, Galaxy", "Hi, Circle", or "Hi Gear" to the user.

Figure 15C:
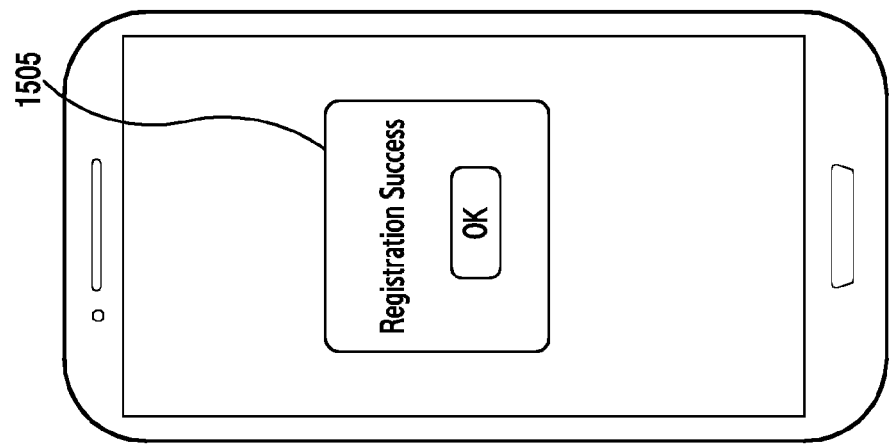
FIG. 15C is a diagram of an example of a user interface, according to an embodiment of the present disclosure.
Figure 15B:
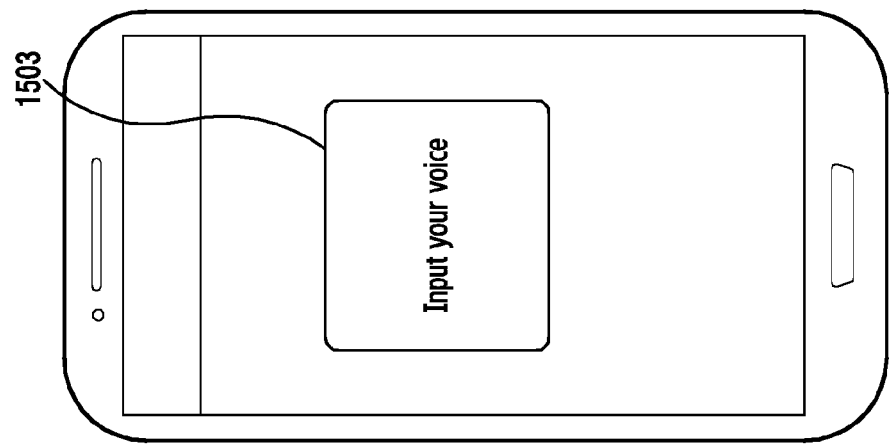
FIG. 15B is a diagram of an example of a user interface, according to an embodiment of the present disclosure.
Figure 15A:
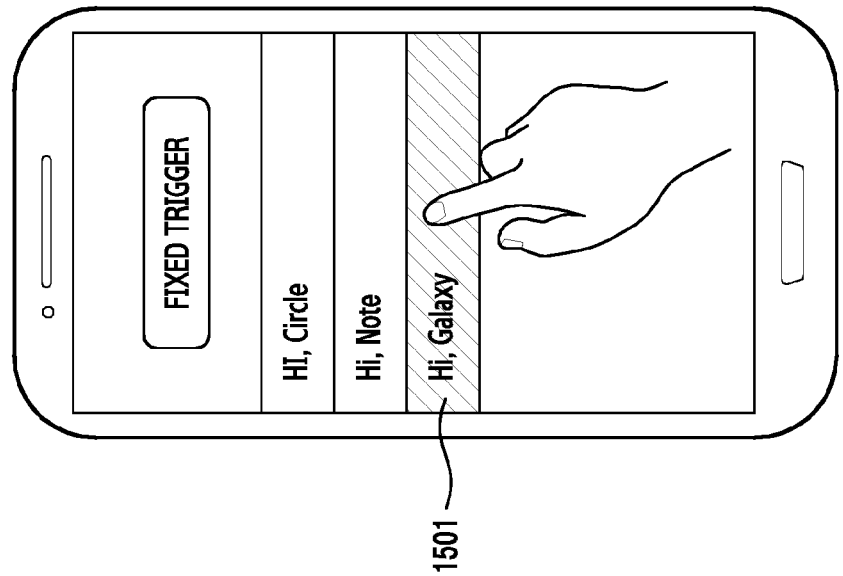
FIG. 15A is a diagram of an example of a user interface, according to an embodiment of the present disclosure.

FIGS. 15A-C are diagrams of an example of a user interface, according to an embodiment of the present disclosure.

FIG. 15A according to an embodiment of the present disclosure illustrates a screen for selecting a fixed trigger. According to an embodiment, the fixed trigger may include a fixed trigger of the electronic device (for example, the electronic device 101) and a fixed trigger of the external device.

In FIG. 15A, when the user selects a button (or area) of the fixed trigger "Hi, Galaxy" 1501, the external device may output a screen for inducing the user to input a voice in FIG. 15B according to an embodiment of the present disclosure. For example, the external device may output a phrase 1503 of "Input your voice" in order to guide the user to input the voice.

According to an embodiment, the external device may output a screen for inducing the user to input the voice a predetermined number of times (for example, five times) or more.

According to an embodiment, when the user inputs the voice and at least a part of registration information is generated, the external device may output a screen indicating that at least the part of the registration information has been generated as illustrated in FIG. 15C. For example, the external device may output a phrase 1505 of "Registration success" indicating that the registration information has been successfully generated.

FIGS. 16A-C are diagrams of an example of a user interface, according to an embodiment of the present disclosure.

According to an embodiment, in order to perform a communication connection function using user recognition, the communication connection function (or smart pairing function) using user recognition may be activated.

When the smart pairing function according to an embodiment of the present disclosure is activated, a screen for inducing the user to input the voice may be output as illustrated in FIG. 16A. For example, the external device may output a phrase 1601 of "Input your voice". According to an embodiment, when the user inputs the voice and the user (or user's voice) is recognized, the electronic device (for example, the electronic device 101) may output a phrase indicating that the user recognition has succeeded as illustrated in FIG. 16B. For example, the electronic device may output a phrase 1603 of "Registration success" indicating that the user recognition has succeeded. However, the present disclosure is not limited thereto.

According to an embodiment, when the user recognition is successful, the electronic device may output a phrase 1605 for identifying whether to establish a communication connection with the external device corresponding to the user (or user's voice) in FIG. 16C. For example, the electronic device may output the phrase 1605 of "Pairing with Galaxy?" in order identify the communication connection with the external device (for example, Galaxy).

Figures 17A, 17B:
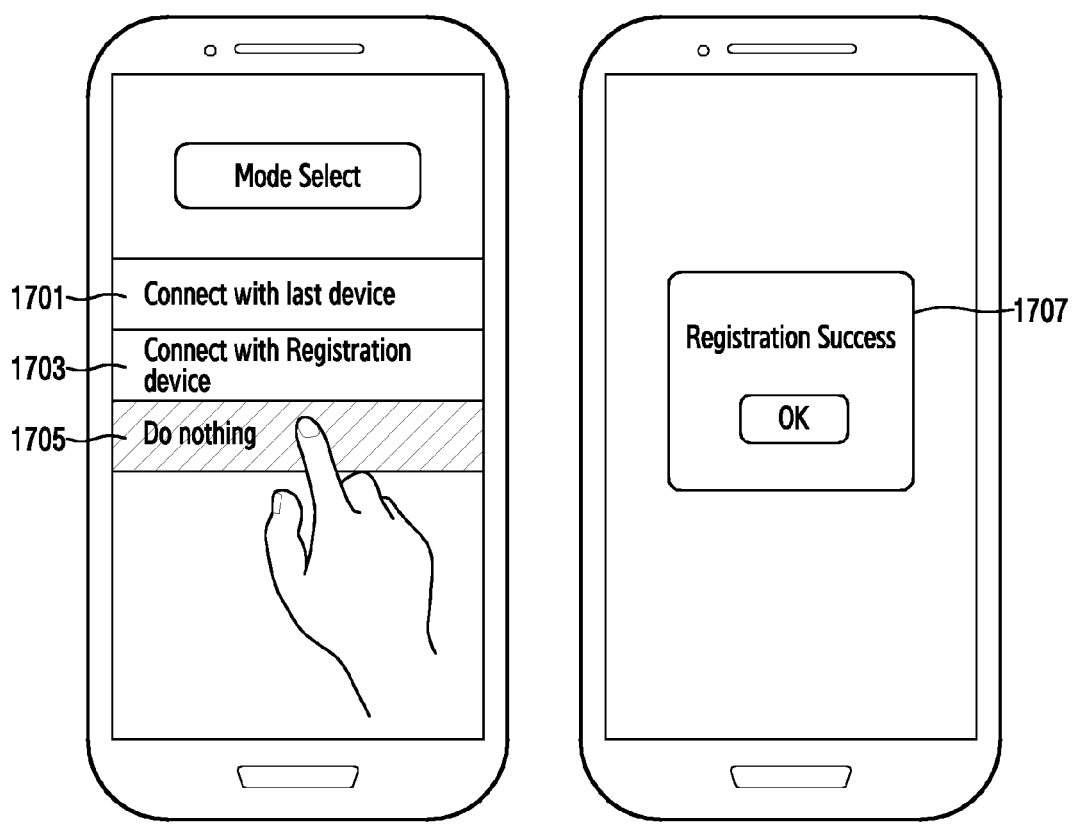
FIG. 17A is a diagram of an example of a user interface, according to an embodiment of the present disclosure.
FIG. 17B is a diagram of an example of a user interface, according to an embodiment of the present disclosure.

FIGS. 17A-B are diagrams of an example of a user interface, according an embodiment of the present disclosure.

According to an embodiment, when a user is not recognized, a processor (for example, the processor 120) may set a mode (for example, a "connect with last device" mode) in which an electronic device (for example, the electronic device 101) establishes a communication connection with an external device, with which the electronic device most recently established the communication connection.

According to another embodiment, when the user is not recognized, for example, when the processor fails the user recognition a predetermined number of times (for example, five times) or more, the processor may set a mode (for example, a "connect with registration device" mode) in which the communication connection is limited such that only communication connections with external devices registered for the smart pairing function are permitted and communication connections with other external devices except for the external devices registered for the smart pairing function are not permitted.

According to another embodiment, when the processor fails the user recognition a predetermined number of times or more, the processor may set a mode (for example, a "do nothing" mode) in which the communication connection is limited such that the communication connection with the external device including the external device registered for the smart pairing function is not permitted.

According to an embodiment, when a mode which the processor enters when the user recognition fails is set, the processor may activate a function for entering the set mode when the user recognition fails.

According to an embodiment, the processor may control a display (for example, the display 160) to output a menu screen for selecting the mode which the processor enters when the user recognition fails as illustrated in FIG. 17A. For example, the processor may control the display to output a button 1701 for displaying the "connect with last device" mode, a button 1703 for displaying the "connect with registration device" mode, and a button 1705 for displaying the "do nothing mode". According to an embodiment, when the user selects the "do nothing mode" button 1705 in FIG. 17A, the electronic device may output a phrase indicating that the mode performed when the user recognition fails has been successfully set as illustrated in FIG. 17B. For example, the external device may output a phrase 1707 of "Registration success" indicating that the user recognition has succeeded. However, the present disclosure is not limited thereto.

Figure 18:
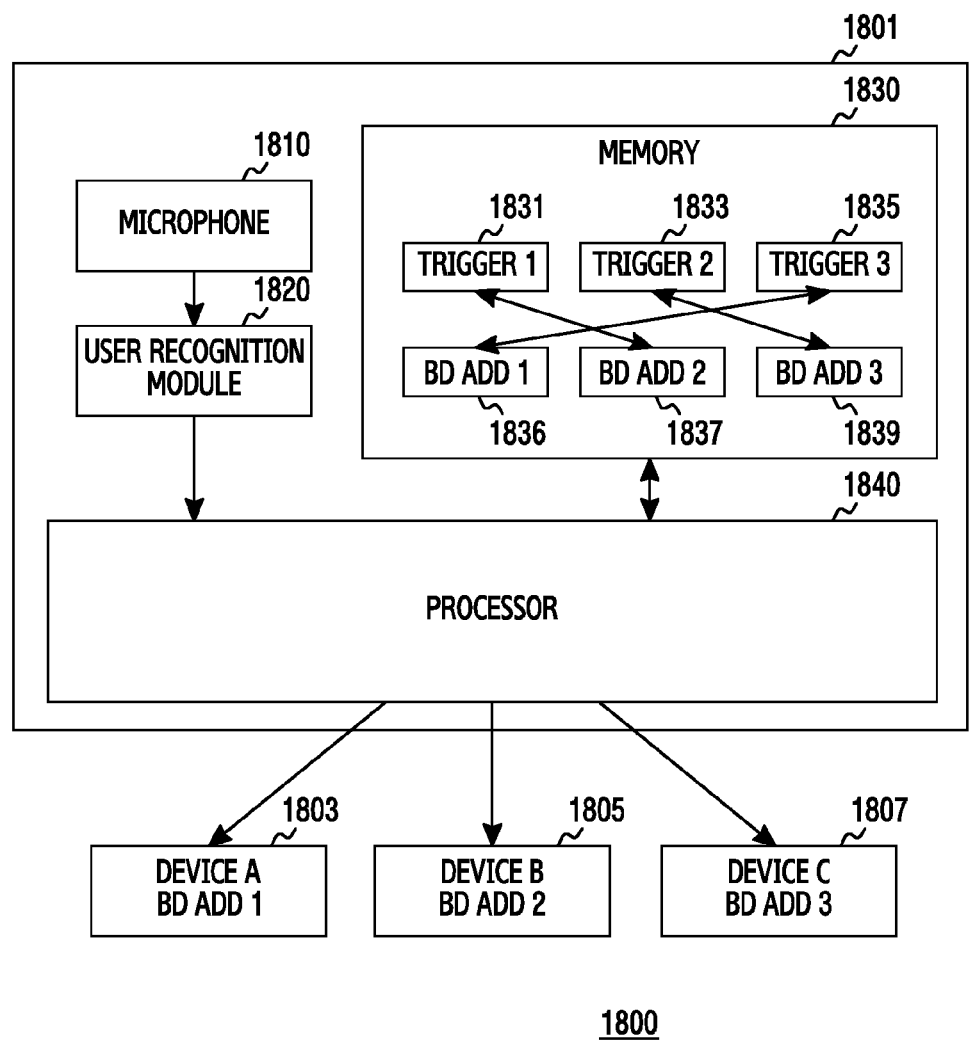
FIG. 18 is a block diagram of an example of a system, according to an embodiment of the present disclosure.

FIG. 18 is a block diagram of an example of a system, according to an embodiment of the present disclosure.

According to an embodiment, a system 1800 may include an electronic device 1801 and one or more external devices 1803, 1805, and 1807.

According to an embodiment, the electronic device 1801 may be a headset, an earphone device, or a speaker, and the external devices 1803, 1805, and 1807 may be at least one of a smart phone, a tablet PC, a television, a robot, an infotainment system of a car, a head unit of a car, a mobile phone, a video phone, a desktop PC, a laptop PC, and a netbook computer. According to another embodiment, the electronic device 1801 may be a smart phone, and the external devices 1803, 1805, and 1807 may be at least one of a smart phone accessory device, a tablet PC, a television, a robot, an infotainment system of a car, a head unit of a car, a mobile phone, a video phone, a desktop PC, a laptop PC, and a netbook computer The electronic device 1801 according to an embodiment of the present disclosure may include a microphone 1810, a user recognition module 1820, a memory 1830, and a processor 1840.

According to an embodiment, the microphone 1810 may receive voice of the user. The microphone 1810 may convert the input voice (or, a voice signal or an analog signal) into an electric signal (or a digital signal) and transfer the converted electric signal to the user recognition module 1820.

According to an embodiment, the user recognition module 1820 may be a module for recognizing (or identifying or verifying) the user (or a speaker) based at least in part on voice data associated with the user.

According to an embodiment, the user recognition module 1820 may recognize the voice as well as the user based at least in part on of the user's voice. According to an embodiment, voice recognition may be an operation for identifying linguistic semantic contents from the voice by an automatic means. For example, the voice recognition may be a processing operation for identifying a word or a word string at least based on a waveform of the input voice and extracting a meaning. In another example, the voice recognition may include recognizing a phoneme, recognizing a word, analyzing a sentence, and extracting a meaning as well as analyzing the voice.

According to an embodiment, the user recognition module 1820 may be omitted. For example, when instructions for recognizing the user are stored within the memory 1830 and the processor 1840 recognizes the user by using the stored instructions, the user recognition module 1820 may be omitted.

According to an embodiment, the processor 1840 may control the overall operation for the performance of communication using user recognition.

According to an embodiment, the processor 1840 may search for triggers (or trigger identifications) stored in the memory 1830 and information related external devices mapped to the triggers based at least in part on of the voice recognized by the user recognition module 1820. According to aspects of the disclosure, the memory 130 may include any suitable type of volatile or non-volatile memory, such as Random-access Memory (RAM), Read-Only Memory (ROM), Network Accessible Storage (NAS), cloud storage, a Solid State Drive (SSD), etc.

The processor 1840 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. In operation, the processor 1840 may search for trigger #1 1831 and a Bluetooth device address (BD_add2) 1837 of the second external device 1805 mapped to trigger #1 1831. In another example, the processor 1840 may search for trigger #2 1833 and a Bluetooth device address (BD_add3) 1839 of the third external device 1807 mapped to trigger #2 1833. For example, the processor 1840 may search for trigger #3 1835 and a Bluetooth device address (BD_add1) 1836 of the first external device 1803 mapped to trigger #3 1835.

According to an embodiment, based on the trigger and at least a part of the information related to the external device mapped to the trigger, the processor 1840 may transmit a connection request to the corresponding external device.

For example, when information related to the external device mapped to trigger #1 1831 corresponds to the second external device 1805, the processor may transmit the connection request to the second external device 1805. In another example, when information related to the external device mapped to trigger #2 1833 corresponds to the third external device 1807, the processor may transmit the connection request to the third external device 1807. For example, when information related to the external device mapped to trigger #3 1835 corresponds to the first external device 1803, the processor may transmit the connection request to the first external device 1803.

Figure 19:
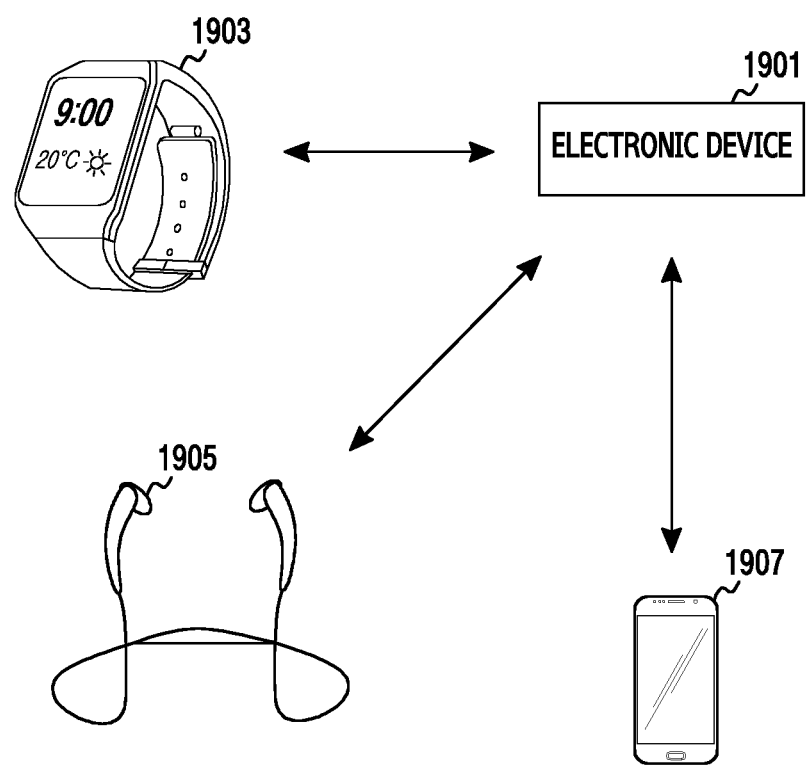
FIG. 19 is a block diagram of an example of a system, according to an embodiment of the present disclosure.

FIG. 19 is a block diagram of an example of a system, according to an embodiment of the present disclosure.

An electronic device 1901 according to an embodiment of the present disclosure may establish communication connections with one or more external devices 1903, 1905, and 1907.

According to an embodiment, the electronic device 1901 may be a headset, an earphone device, or a speaker, and the one or more external devices 1903, 1905, and 1907 may be at least one of a smart phone, a tablet PC, a television, a robot, an infotainment system of a car, a head unit of a car, a mobile phone, a video phone, a desktop PC, a laptop PC, and a netbook computer. According to another embodiment, the electronic device 1901 may be a smart phone, and the external devices 1903, 1905, and 1907 may be at least one of a smart phone accessory device, a tablet PC, a television, a robot, an infotainment system of a car, a head unit of a car, a mobile phone, a video phone, a desktop PC, a laptop PC, and a netbook computer.

According to an embodiment, the communication between the electronic device 1901 and the one or more external devices 1903, 1905, and 1907 may include all applicable communications such as wireless communication and/or wired communication including Wireless Local Area Network (WLAN) using frequency bands of 2.4 GHz and 5 GHz, millimeter wave communication using millimeter wave frequency bands (for example, 60 GHz, 28 GHz, 32 GHz, and 38 GHz), Wide Area Network (WAN), cellular communication, and mobile communication (for example, 3G, 4G, LTE, and LTE-A) as well as the Bluetooth communication.

According to an embodiment, the electronic device 1901 or the one or more external devices 1903, 1905, and 1907 may be a device including a display. According to another embodiment, the electronic device 1901 or the one or more external devices 1903, 1905, and 1907 may be a device, which does not include a display.

According to an embodiment, the electronic device 1901 may acquire one or more voices by using a microphone of the electronic device 1901 and recognize a user corresponding to the one or more acquired voices.

According to an embodiment, the electronic device 1901 may select one of a plurality of external devices 1903, 1905, and 1907 at least partially based on the user recognition.

According to an embodiment, the electronic device 1901 may transmit a request for connecting to the selected external device to the selected external device.

Figure 20:
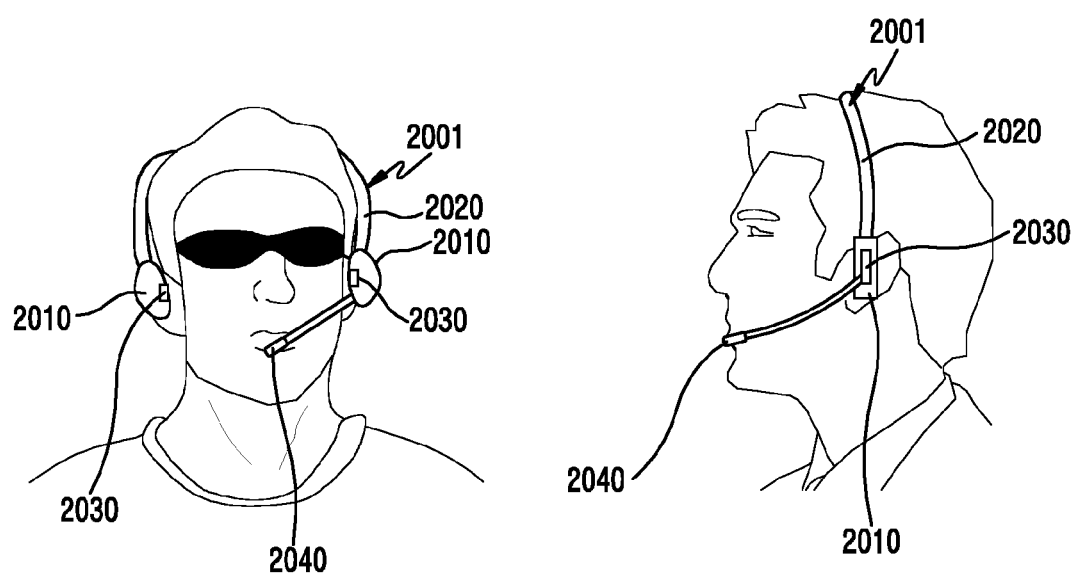
FIG. 20 is a diagram illustrating an example of an electronic device, according to an embodiment of the present disclosure.

FIG. 20 is a diagram illustrating an example of an electronic device, according to an embodiment of the present disclosure.

According to an embodiment, an electronic device 2001 may be a headset. However, the present disclosure is not limited thereto. For example, the electronic device 2001 may be the headset, an earphone device, or a speaker, or may be at least one of a smart phone, a tablet PC, a television, a robot, an infotainment system of a car, a head unit of a car, a mobile phone, a video phone, a desktop PC, a laptop PC, and a netbook computer.

According to an embodiment, a housing of the electronic device 2001 may include a first structure 2010 configured to be worn on the user's ears and a second structure 2020 configured to fix the electronic device 2001 to the user.

According to an embodiment, the first structure 2010 may further include a speaker 2030, which is exposed through a part of the first structure 2010 and arranged to face user's eardrums.

According to an embodiment, the second structure 2020 may be connected to the first structure 2010 and at least a part of the second structure 2020 may include a microphone 2040.

A method of operating an electronic device according to various embodiments of the present disclosure may include: an operation of acquiring one or more voices by using the microphone of the electronic device of claim 1; an operation of recognizing a user corresponding to the one or more acquired voices; an operation of selecting one of a plurality of external devices at least partially based on the user recognition; and an operation of transmitting a request for a connection with the selected external device to the selected external device by using a communication circuit of the electronic device when the instructions are executed.

According to an embodiment, the method may include: an operation of transmitting a request for a connection with a first external device to the first external device by using the communication circuit when the recognized user is a first user; and an operation of transmitting a request for a connection with a second external device to the second external device when the recognized user is a second user.

According to an embodiment, the method may further include selecting one of the plurality of external devices at least partially based on contents of the acquired voice.

According to an embodiment, the method may include: an operation of determining whether the acquired voice includes at least one of a selected term, phrase, and sentence; and an operation of recognizing the user corresponding to the acquired voice when the acquired voice includes at least one of the selected term, phrase, and sentence.

According to an embodiment, when the acquired voice does not include at least one of the selected term, phrase, and sentence, the method may include establishing the connection with the external device by a pairing scheme set by default without recognizing the user corresponding to the acquired voice.

According to an embodiment, the pairing scheme set by default may include a scheme for establishing a connection with an external device, which was just previously paired with the electronic device, a scheme for establishing a connection with an external device, which has been most frequently paired with the electronic device previously, a scheme for establishing a connection with an external device, which is mostly closed located to the electronic device, or a combination of one or more of schemes for establishing a connection with a device, which provides a selected function related to a current state or operation of the electronic device.

According to an embodiment, the method may include transmitting signals that make a request for a communication connection to a plurality of external devices corresponding to the recognized user.

According to an embodiment, the method may include: an operation of identifying whether the selected external device is in an active state; and an operation of transmitting a request for activating the external device and/or a request for a connection with the external device to the external device by using the communication circuit according to whether the external device is in the active state.

According to an embodiment, the method may include: an operation of storing in advance a user's voice received through the microphone and/or a user's voice received through a microphone of the external device in a memory; and an operation of recognizing the user corresponding to the one or more acquired voices at least partially based on the stored user's voice.

According to an embodiment, the method may include: an operation of wirelessly communicating with the external device by using the communication circuit; an operation of transmitting a request for acquiring the user's voice, to the external device; and an operation of receiving information on the user's voice acquired by the external device from the external device.

According to an embodiment, the method may include: an operation of storing in advance at least one of a term, phrase, and sentence included in the user's voice received through the microphone or through the microphone of the external device in the memory; and an operation of recognizing the user corresponding to the acquired voice when the acquired voice includes at least one of the stored term, phrase, and sentence.

According to an embodiment, the communication circuit may be configured to support at least one of short-range communication including Bluetooth communication, Wireless Local Area Network (WLAN), millimeter wave communication, cellular communication, mobile communication, and wired communication.

According to an embodiment, the electronic device may not include a display.

According to an embodiment, the plurality of external devices may include an electronic device having a display.

As described above, the method of performing communication using user recognition and the electronic device supporting the same according to various embodiments of the present disclosure can establish a communication connection with an external device by recognizing a user based on a voice or selectively recognizing the voice.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

According to an embodiment, a computer-readable recording medium having a program recorded therein to execute operations, the operations comprises acquiring one or more voices by using a microphone of an electronic device, by the electronic device, recognizing a user corresponding to the one or more acquired voices, selecting one of a plurality of external devices at least partially based on the user recognition, and transmitting a request for a connection with the selected external device to the selected external device by using a communication circuit of the electronic device.

FIGS. 1-20 are provided as an example only. At least some of the operations discussed with respect to these figures can be performed concurrently, performed in different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute software per se.

Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

What is claimed is:

1. An electronic device comprising:
a microphone;
a communication circuit;
a memory; and
at least one processor operatively coupled to the memory, configured to:
acquire voice data by using the microphone;
identify a user corresponding to the voice data;
select an external device based at least in part on an identity of the user; and
transmit a connection request to the external device by using the communication circuit,
wherein the at least one processor is further configured to:
transmit a request for a connection with a first external device to the first external device by using the communication circuit when the user is a first user; and
transmit a request for a connection with a second external device to the second external device when the user is a second user.

2. The electronic device of claim 1, wherein the external device is selected based at least in part on content that is represented by the voice data.

3. The electronic device of claim 1, wherein the user is identified based at least in part on whether the voice data represents one or more of a selected term, phrase, and sentence.

4. The electronic device of claim 1, wherein the at least one processor is further configured to establish a connection with a default device when the user cannot be identified.

5. The electronic device of claim 4, wherein the default device includes at least one of:

a device that was most recently connected to the electronic device, a device with which the electronic device is most frequently paired within a predetermined time period, a device which is closest to the electronic device.

6. The electronic device of claim 1, wherein the at least one processor is further configured to transmit a plurality of connection requests to a plurality of external devices that corresponds to the user.

7. The electronic device of claim 1, wherein the at least one processor is further configured to:

detect whether the external device is in an active state; and transmit an activation request for activating the external device by using the communication circuit, in response to detecting that the external device is not in the active state.

8. The electronic device of claim 1, wherein:

the memory is configured to store a voice template associated with the user, and the user is identified at least in part based on the voice template.

9. The electronic device of claim 1, wherein the at least one processor is further configured to receive, from the external device, information associated with the user's voice that is acquired by the external device.

10. A method for use in an electronic device, comprising:

acquiring voice data by using a microphone;

identifying a user corresponding to the voice data;

selecting an external device based at least in part on an identity of the user; and transmitting a connection request to the external device by using a communication circuit, wherein transmitting the connection request comprises:

transmitting a request for a connection with a first external device to the first external device by using the communication circuit when the user is a first user; and transmitting a request for a connection with a second external device to the second external device when the user is a second user.

11. The method of claim 10, wherein the external device is selected based at least in part on content that is represented by the voice data.

12. The method of claim 11, wherein the user is identified based at least in part on whether the voice data represents one or more of a selected term, phrase, and sentence.

13. The method of claim 10, further comprising establishing a connection with a default device when the user cannot be identified.

14. The method of claim 13, wherein the default device includes at least one of:

a device that was most recently connected to the electronic device, a device with which the electronic device is most frequently paired within a predetermined time period, a device which is closest to the electronic device.

15. The method of claim 10, further comprising transmitting a plurality of connection requests to a plurality of external devices that corresponds to the user.

16. The method of claim 10, further comprising:

detecting whether the external device is in an active state; and transmitting an activation request to the external device in response to detecting that the external device is not in the active state.

17. The method of claim 10, further comprising storing, in a memory, a voice template associated with the user, wherein the user is identified based on the voice template.

18. A non-transitory computer-readable recording medium storing one or more processor-executable instructions which when executed by at least one processor cause the at least one processor to perform a method comprising the steps of:

acquiring voice data;

identifying a user corresponding to the voice data;

selecting an external device based at least in part on an identity of the user; and transmitting a connection request to the external device, wherein transmitting the connection request comprises:

transmitting a request for a connection with a first external device to the first external device by using the communication circuit when the user is a first user; and transmitting a request for a connection with a second external device to the second external device when the user is a second user.

* * * * *